US010432320B2

(12) United States Patent
Gorshkov et al.

(10) Patent No.: US 10,432,320 B2
(45) Date of Patent: Oct. 1, 2019

(54) FAST ENTANGLED STATE GENERATION AND QUANTUM INFORMATION TRANSFER IN A QUANTUM SYSTEM WITH LONG-RANGE INTERACTIONS

(71) Applicant: Government of the United States of America, as represented by the Secretary of Commerce, Gaithersburg, MD (US)

(72) Inventors: Alexey V. Gorshkov, Rockville, MD (US); Michael Foss-Feig, Baltimore, MD (US); Zachary Eldredge, Adelphi, MD (US); Zhe-Xuan Gong, College Park, MD (US); Ali Hamed Moosavian, College Park, MD (US); Jeremy T. Young, College Park, MD (US)

(73) Assignee: GOVERNMENT OF THE UNITED STATES OF AMERICA, AS REPRESENTED BY THE SECRETARY OF COMMERCE, Gaithersburg, MD (US)

(*) Notice: Subject to any disclaimer, the term of this patent is extended or adjusted under 35 U.S.C. 154(b) by 0 days.

(21) Appl. No.: 15/802,146

(22) Filed: Nov. 2, 2017

(65) Prior Publication Data

US 2018/0159636 A1 Jun. 7, 2018

Related U.S. Application Data

(60) Provisional application No. 62/430,133, filed on Dec. 5, 2016.

(51) Int. Cl.
*H04B 10/90* (2013.01)
*H04B 10/70* (2013.01)

(52) U.S. Cl.
CPC ............. *H04B 10/90* (2013.01); *H04B 10/70* (2013.01)

(58) Field of Classification Search
CPC ................................ H04B 10/90; H04B 10/70
See application file for complete search history.

(56) References Cited

U.S. PATENT DOCUMENTS

| 8,547,090 B2 | 10/2013 | Lukin et al. |
| 8,781,334 B2 | 7/2014 | Munro et al. |

(Continued)

OTHER PUBLICATIONS

Quantum entanglement—Wikipedia.*

(Continued)

*Primary Examiner* — Zhitong Chen
(74) *Attorney, Agent, or Firm* — Office of Chief Counsel for National Institute of Standards and Technology

(57) ABSTRACT

A process for generating an entangled state of a plurality of particles includes: providing the plurality of particles, the plurality of particles interacting via long range interactions; producing a first entangled state in a first particle; entangling the first particle with a second particle to form a second entangled state, wherein particles that are not in the second entangled state are remaining particles; and proceeding, starting with the second entangled state, to propagate entanglement in a logarithmic progression through the remaining particles in a recursive manner, to produce an intermediate entangled state, such that the intermediate entangled state acts as an initial entangled state for a next iteration, until a final entangled state is formed to generate the entangled state of the particles.

19 Claims, 16 Drawing Sheets

(56) References Cited

U.S. PATENT DOCUMENTS 8,947,080 B2     2/2015    Lukin et al.
2008/0258049 A1   10/2008   Kuzmich et al.

OTHER PUBLICATIONS

Juan Yin, Bounding the speed of 'spooky action at a distance'.*
Brian Dodson, The speed of entanglement dynamics is at least 10,000 times faster than light.*
Alain Aspect, Closing the Door on Einstein and Bohr's Quantum Debate.*
Howard Wiseman, Death by experiment for local realism.*
Ryan F. Mandelbaum, Scientists Finally Prove Strange Quantum Physics Idea Einstein Hated.*
N. Gisin, A local hidden variable model of quantum correlation exploiting the detection loophole.*
Wikipedia, Quantum entanglement.*
B. Hensen, Loophole-free Bell inequality violation using electron spins separated by 1.3 kilometres.*
Serbyn, M., et al., "Universal Growth of Entanglement in Interacting Strongly Disordered Systems", Physical Review Letters, 2013, 260601, vol. 110.
Hetterich, D., et al., "Noninteracting Central Site Model: Localization and Logarithmic Entanglement Growth", Physical Review B., 2017, 104203, vol. 96.
International Search Report and Written Opinion dated Mar. 13, 2018 in the name of the Government of the United States of America, As Represented by the Secretary of Commerce.
J.J Bollinger, et al., Optimal frequency measurements with maximally correlated states, Physical Review A, 1996, R464-R4652, 54(6).
R. Dolde, et al., Room-temperature entanglement between single defect spins in diamond, Nature Physics, 2013, 139-143, 9.
P. Komar, et al., A quantum network of clocks, Nature Physics, 2014, 582-587, 10.
E. S. Polzik, et al., Entanglement and spin squeezing in a network of distant optical lattice clocks, Physical Review A, 2016, 021401-1-021404-5, 93.
D.J. Wineland, et al., Spin squeezing and reduced quantum noise in spectroscopy, Physical Review A, 1992, R6797-R6800, 46(11).
Shalm, L.K., et al., "Strong loophole-free test of local realism", Physical Review Letters, 2015, p. 250402, vol. 115.
Kaplan, S., "Quantum entanglement, science's spookiest phenomenon, achieved in space", The Washington Post, 2017, accessed Feb. 26, 2018, https://www.washingtonpost.com/news/speaking-of-science/wp/2017/06/15/quantum-entanglement-sciences-spookiest-phenomenon-achieved-in-space/?utm_term=.d087b59cfac8.
Conover, E., "Quantum satellite shatters entanglement record", Science News, 2017, p. 14, vol. 192 No. 1.
Feltman, R., "Scientists just smashed the distance record for quantum teleportation", The Washington Post, 2015, accessed Feb. 26, 2018, https://www.washingtonpost.com/news/speaking-of-science/wp/2015/09/23/scientists-just-smashed-the-distance-record-for-quantum-teleportation/?utm_term=.3abea4279153.
Takesue, H., et al., "Quantum teleportation over 100 km of fiber using highly efficient superconducting nanowire single-photon detectors", Optica, 2015, p. 832-835, vol. 2 No. 10.
Giustina. M., et al.,"Significant-loophole-free test of Bell's Theorem with entangled photon", Physical Review Letters, 2015, p. 250401, vol. 115.
Yin, J., et al., "Satellite-based entanglement distribution over 1200 kilometers", Science, 2017, p. 1140-1144, vol. 356.
Jenner, N., "Five practical uses for spooky quantum mechanics", Smithsonian, 2014.
Chen, J., et al., "Experimental implementation of quantum entanglement and hyperentanglement with a fiber-based two-photon source", Proc of SPIE, 2008, p. 709209, vol. 7092.
Honjo, T., et al., "Long-distance entanglement-based quantum key distribution over optical fiber", Optics Express, 2008, p. 19118-19126, vol. 16 No. 23.
"John Stewart Bell Prize for Research on Fundamental Issues in Quantum Mechanics and Their Applications", 2017, accessed Feb. 26, 2018, https://cqiqc.physics.utoronto.ca/bell_prize/hanson_nam_zeilinger.html.
"Bell Prize goes to scientists who proved spooky quantum entanglement is real", NIST News, 2017, accessed Feb. 26, 2018, https://www.nist.gov/about-us/nist-awards/bell-prize-goes-scientists-who-proved-spooky-quantum-entanglement-real.
Hensen, B., et al., "Loophole-free Bell inequality violation using electron spins separated by 1.3 kilometres", Nature, 2015, p. 682-686, vol. 526.
"NIST Team breaks distance record for Quantum Teleportation", NIST News, 2015, accessed Feb. 26, 2018, https://www.nist.gov/news-events/news/2015/09/nist-team-breaks-distance-record-quantum-teleportation.
"NIST Team proves spooky action at a distance is really real", NIST News, 2015, accessed Feb. 26, 2018, https://www.nist.gov/news-events/news/2015/11/nist-team-proves-spooky-action-distance-really-real.

* cited by examiner

FAST ENTANGLED STATE GENERATION AND QUANTUM INFORMATION TRANSFER IN A QUANTUM SYSTEM WITH LONG-RANGE INTERACTIONS

CROSS REFERENCE TO RELATED APPLICATIONS

This application claims the benefit of U.S. Provisional Patent Application Ser. No. 62/430,133, filed Dec. 5, 2016, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce, and under Agreement Nos. PHY1415616 and PHY1430094 awarded by the National Science Foundation, Agreement No. W911NF1410599 awarded by the Army Research Office, and Agreement No. FA95501510173 awarded by the Air Force Office of Scientific Research. The Government has certain rights in the invention. Licensing inquiries may be directed to the Technology Partnerships Office, NIST, Gaithersburg, Md., 20899; voice (301) 301-975-2573; email tpo@nist.gov.

BRIEF DESCRIPTION

Disclosed is a process for generating an entangled state of a plurality of particles that includes: providing the plurality of particles, the plurality of particles interacting via long range interactions; producing a first entangled state in a first particle; entangling the first particle with a second particle to form a second entangled state, wherein particles that are not in the second entangled state are remaining particles; and proceeding, starting with the second entangled state, to propagate entanglement in a logarithmic progression through the remaining particles in a recursive manner, to produce an intermediate entangled state, such that the intermediate entangled state acts as an initial entangled state for a next iteration, until a final entangled state is formed to generate the entangled state of the particles.

Also discloses is a process for transferring quantum information among a plurality of particles that includes: providing the plurality of particles, the plurality of particles interacting via long range interactions; producing a first entangled state in a first particle comprising the quantum information; entangling the first particle with a second particle to form a second entangled state, wherein particles that are not in the second entangled state are remaining particles; proceeding, starting with the second entangled state, to propagate entanglement in a logarithmic progression through the remaining particles in a recursive manner, to produce an intermediate entangled state, such that the intermediate entangled state acts as an initial entangled state for a next iteration, until a final entangled state is formed to generate the entangled state of the particles, such that an ultimate particle comprises the quantum information from the first particle; disentangling the first particle to form a first disentangled state, wherein the first particle no longer comprises the quantum information; disentangling the second particle to form a second disentangled state, such that second particle no longer comprises the quantum information, and wherein particles that are not in the first disentangled state and the second disentangled state are remaining entangled particles; and proceeding, starting with the first disentangled state and the second disentangled state, to propagate disentanglement in a logarithmic progression through the remaining entangled particles in a recursive manner, to produce an intermediate disentangled state, such that the intermediate disentangled state acts as an initial disentangled state for a next iteration, until a penultimate particle obtains a penultimate disentangled state with the ultimate particle in the final entangled state with the quantum information to transfer the quantum information from the first particle to the ultimate particle in an absence of the quantum information being in particles other than the ultimate particle.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

Advantageously and unexpectedly, it has been discovered that a process transfers quantum information and generates entangled states across a plurality of particles that interact via long-range interactions. The transfer and generation are much faster than in a system of particles that have short-range interactions. Particles that have long-range interactions include cold polar molecules, highly excited Rydberg atoms, or nitrogen-vacancy defects in diamond. In some embodiments, long-range interactions include interactions that fall off with distance r as $1/r^3$ (e.g., dipolar interactions) in 3 dimensional arrays, as $1/r^2$ in 2 dimensional arrays, or as $1/r$ in 1 dimensional arrays. Generating entangled states or transferring quantum information as described herein is useful for increasing a speed of quantum computing, increasing precision of sensing (e.g., quickly preparing entangled states for sensing, including distributed sensing), and the like.

Figure 1:
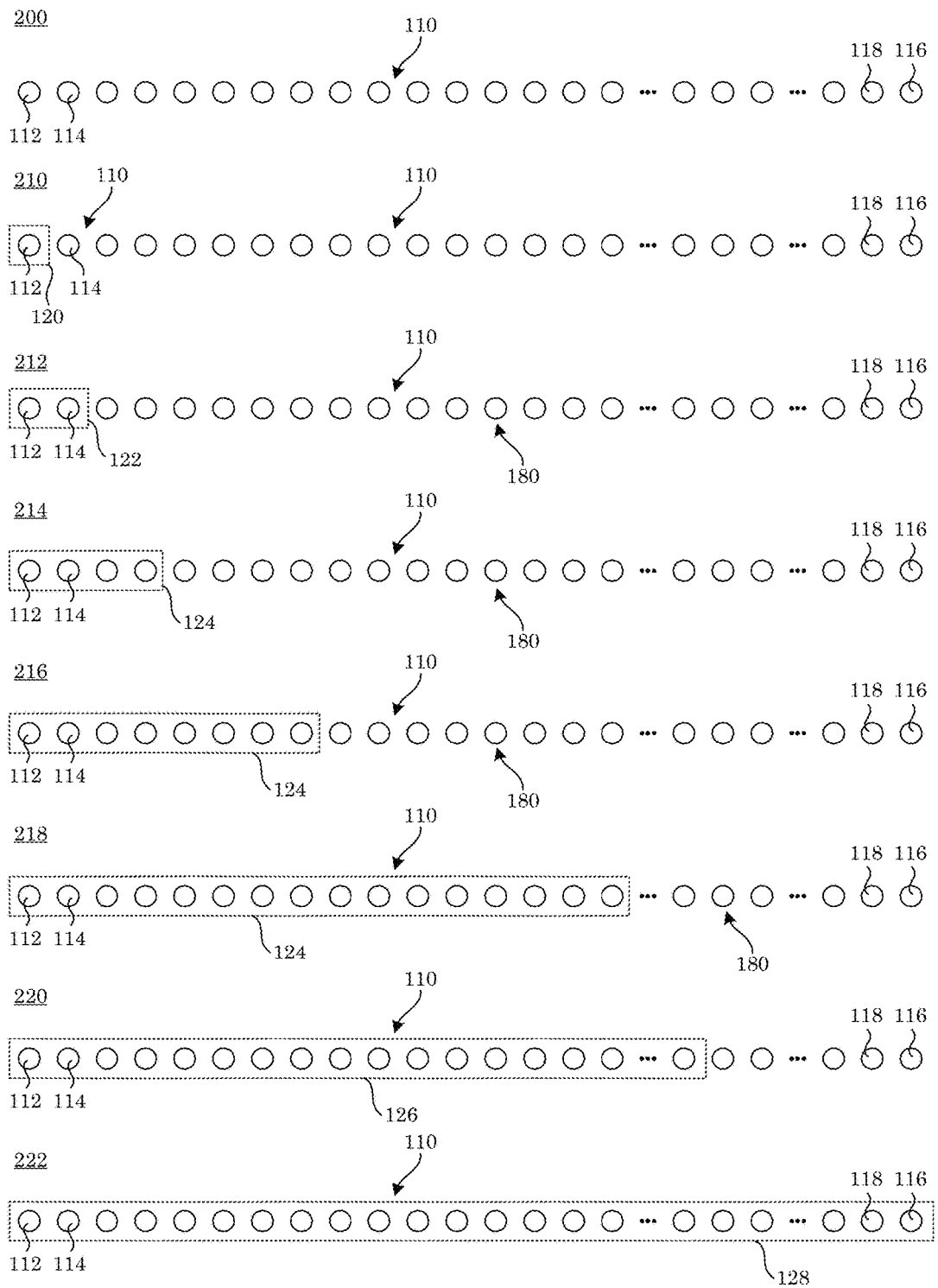
FIG. 1 shows generation of an entangled state in a one-dimensional arrangement of particles.
Figure 2:
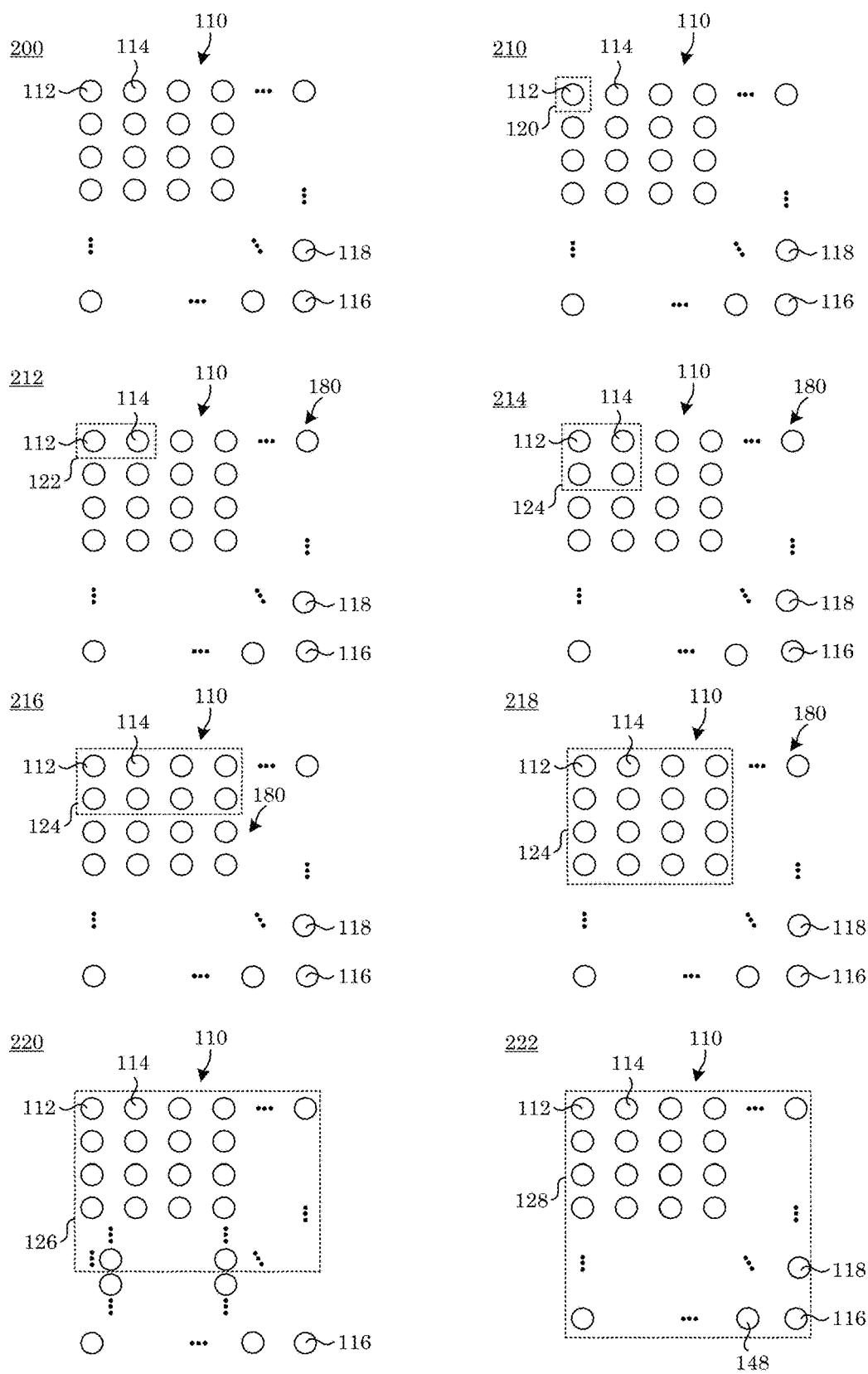
FIG. 2 shows generation of an entangled state in a two-dimensional arrangement of particles.
Figure 3:
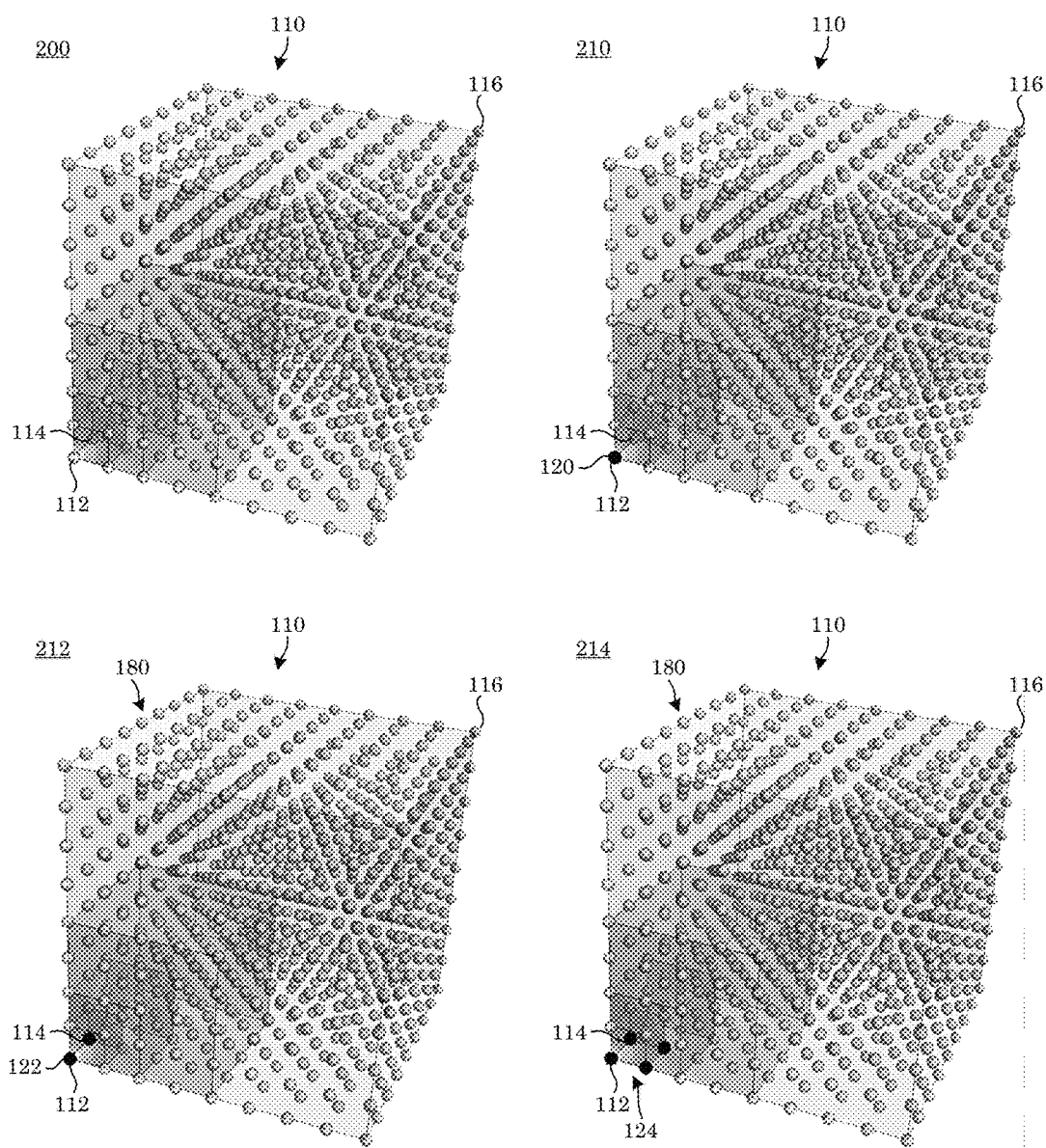
FIG. 3 shows generation of an entangled state in a three-dimensional arrangement of particles.
Figure 4:
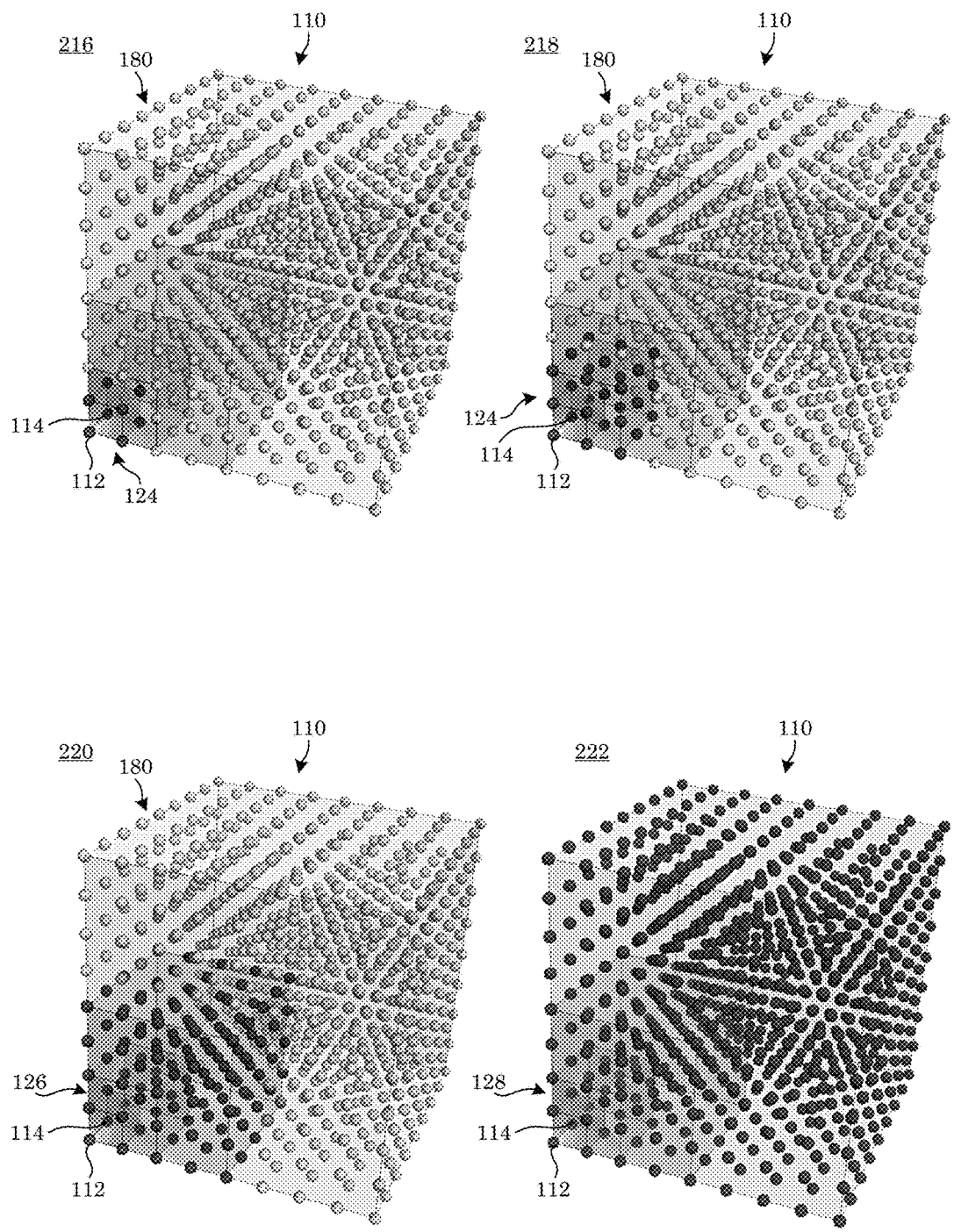
FIG. 4 shows generation of an entangled state in a three-dimensional arrangement of particles.
Figure 5:
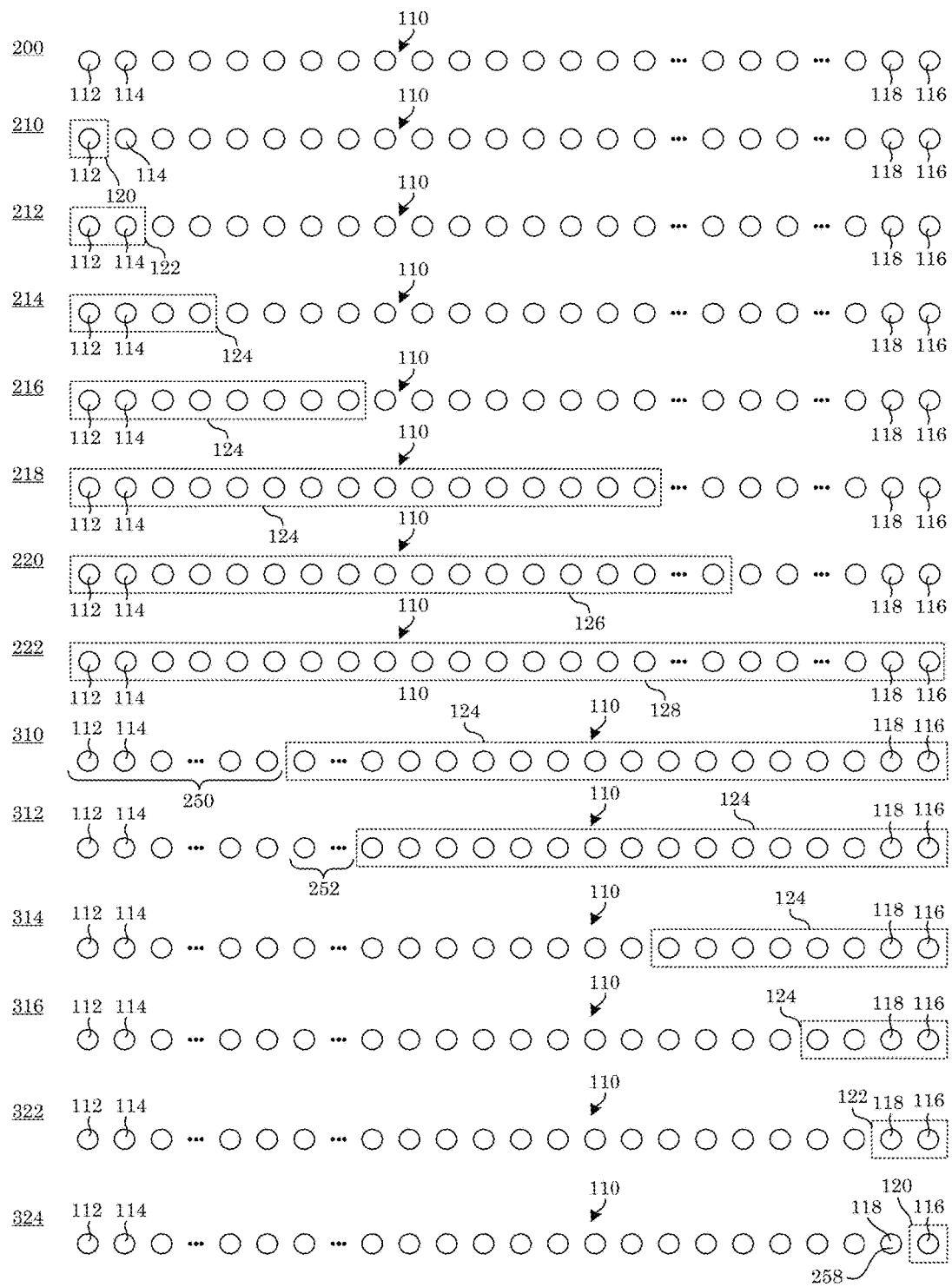
FIG. 5 shows transfer of quantum information in a one-dimensional arrangement of particles.
Figure 6:
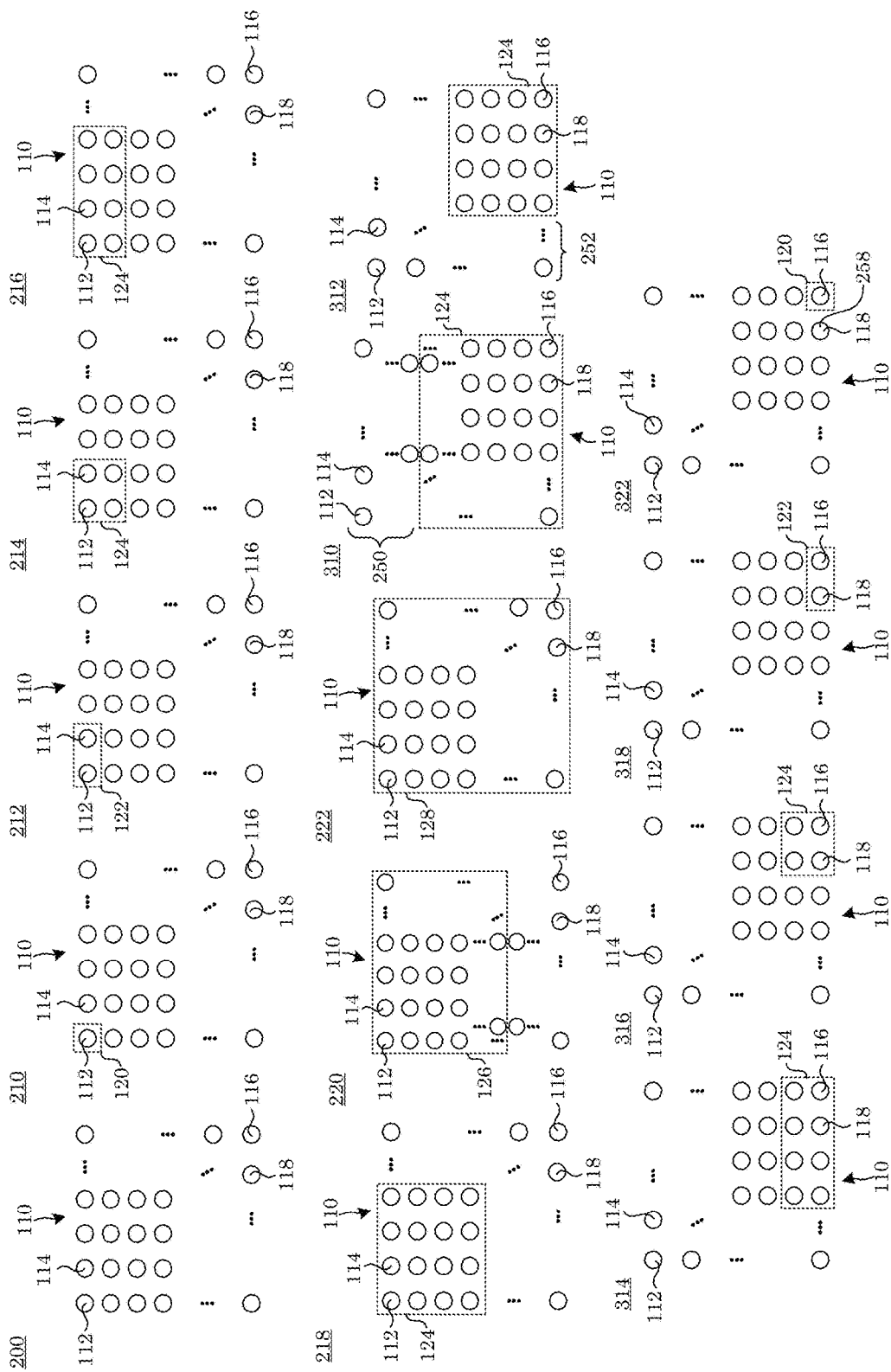
FIG. 6 shows transfer of quantum information in a two-dimensional arrangement of particles.
Figure 7:
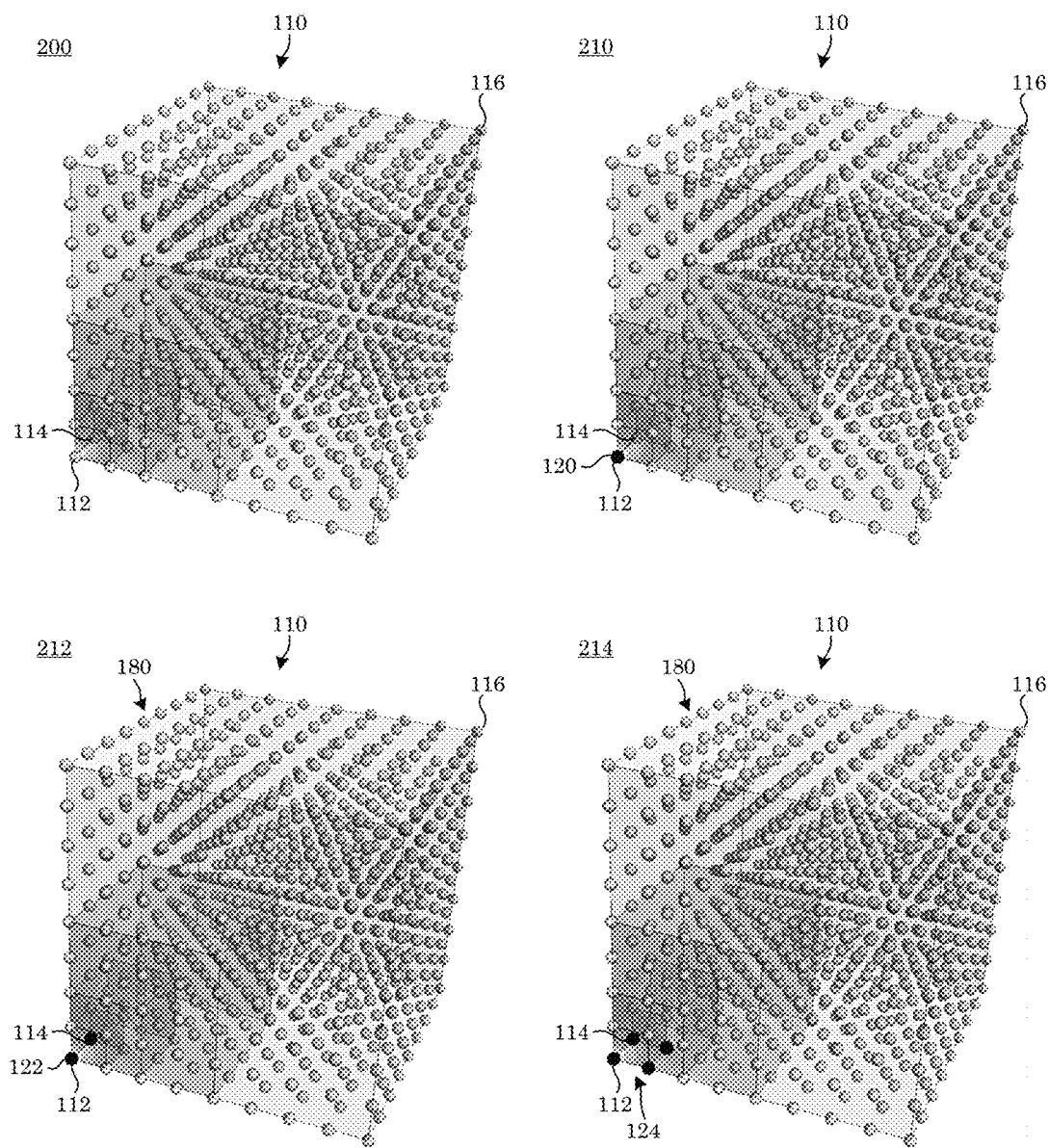
FIG. 7 shows transfer of quantum information in a three-dimensional arrangement of particles.
Figure 8:
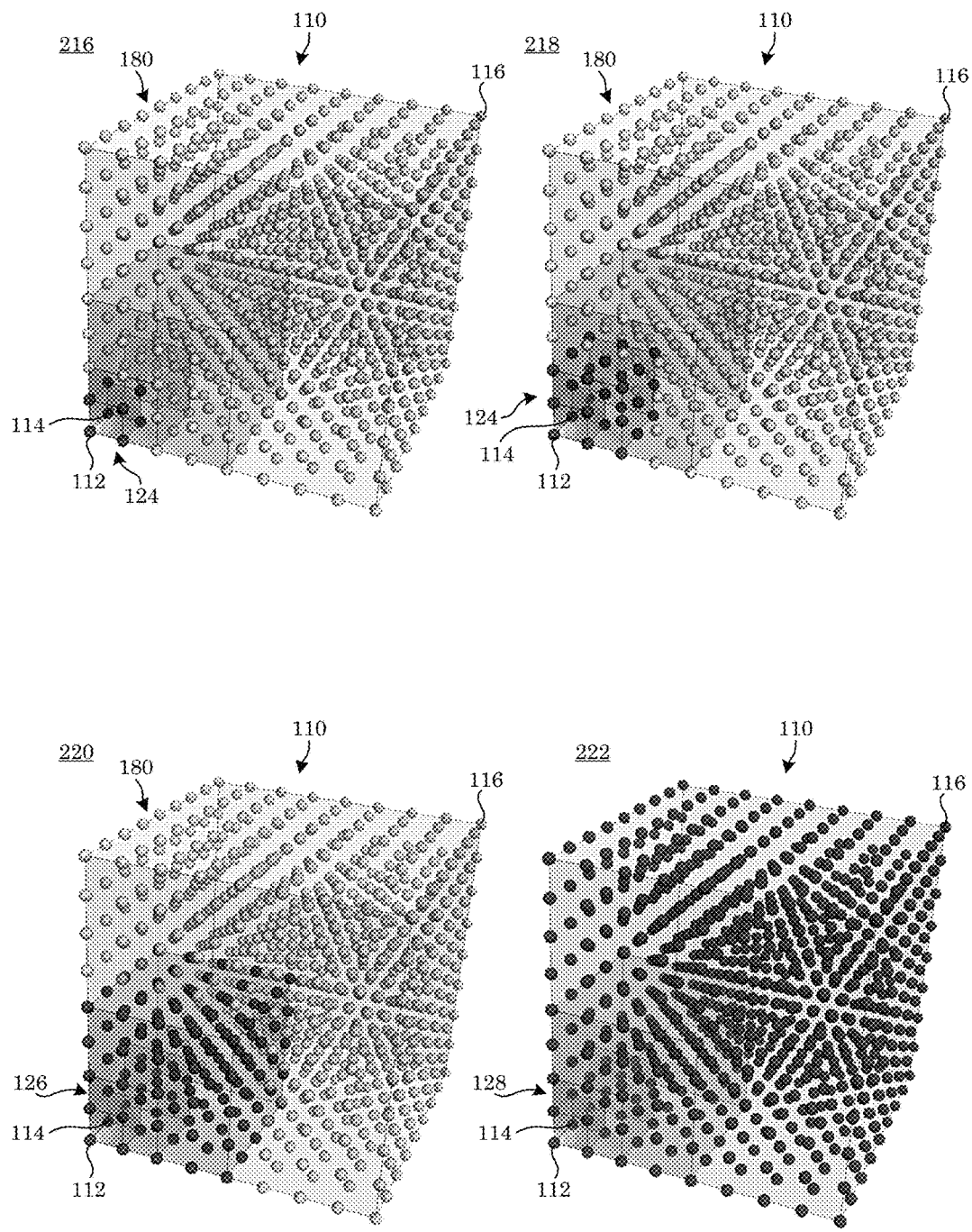
FIG. 8 shows transfer of quantum information in a three-dimensional arrangement of particles.
Figure 9:
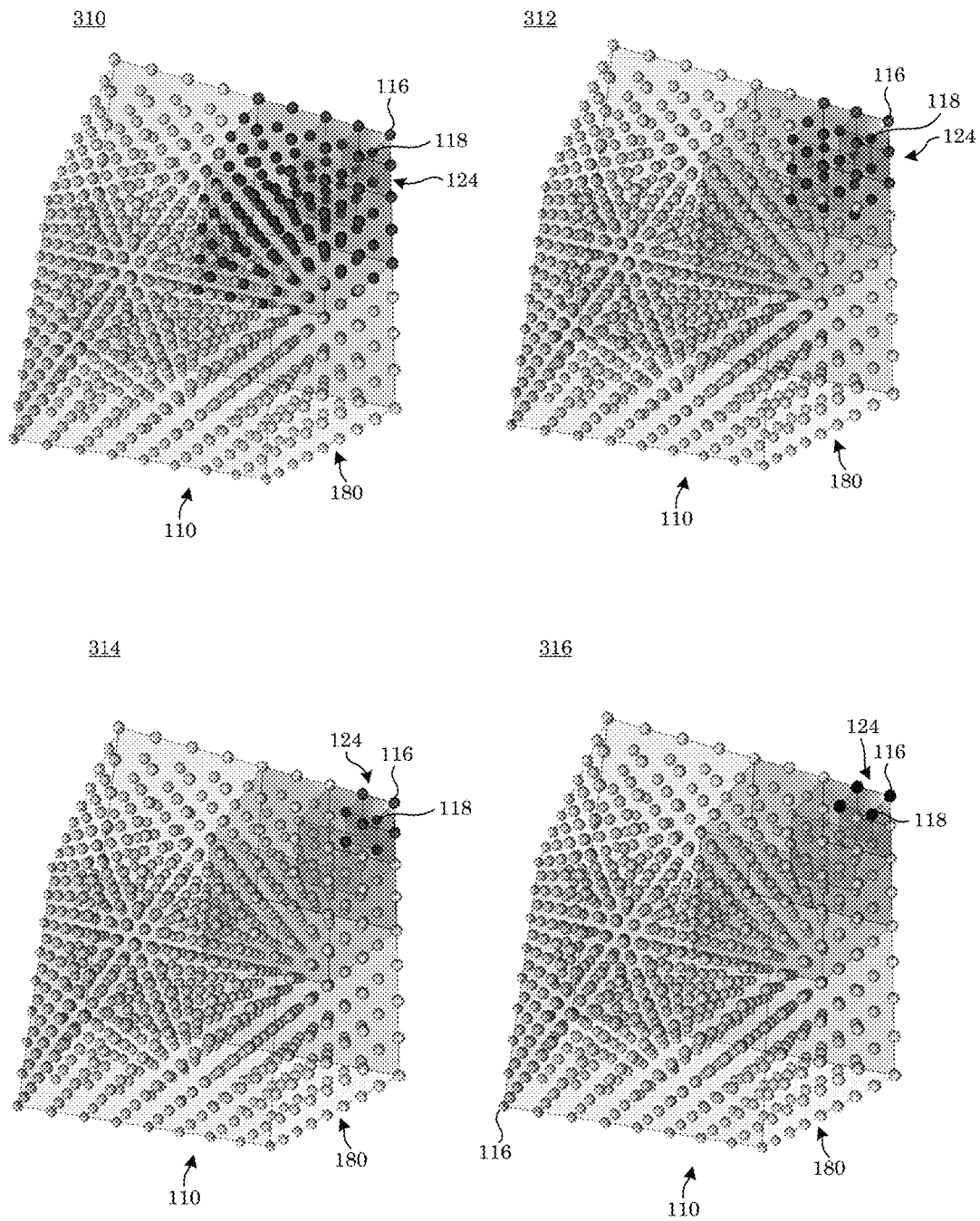
FIG. 9 shows transfer of quantum information in a three-dimensional arrangement of particles.
Figure 10:
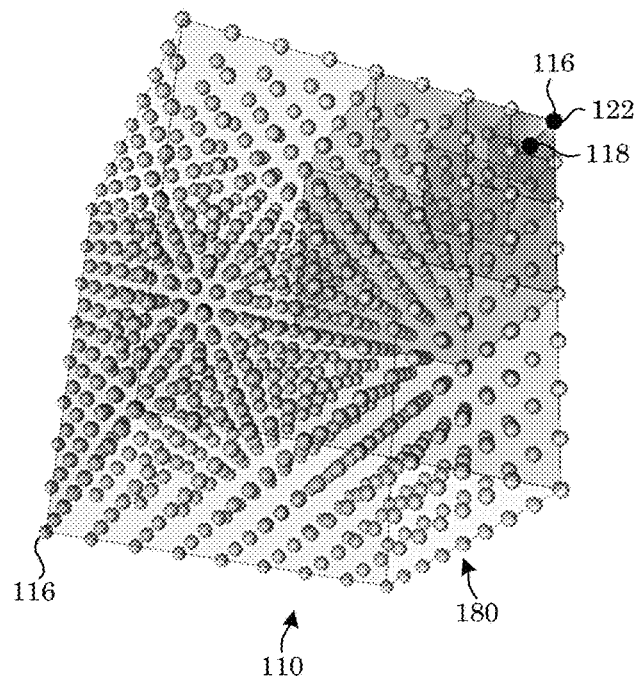
FIG. 10 shows transfer of quantum information in a three-dimensional arrangement of particles.
Figure 10:
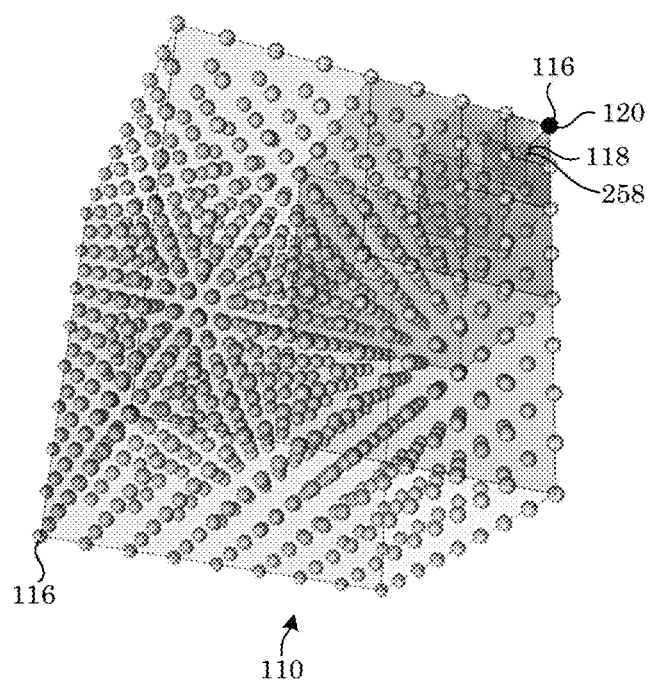

In an embodiment, with reference to FIG. 1, FIG. 2, FIG. 3, and FIG. 4, a process for generating an entangled state in a plurality of particles 110 arranged in one dimension (FIG. 1), two dimensions (FIG. 2), or three dimensions (FIG. 3, and FIG. 4 includes providing particles 110 (step 200) that interact via long range interactions; producing first quantum superposition state 120 in first particle 112 (step 210); entangling first particle 112 with second particle 114 to form a first entangled state 122 (step 212), wherein particles 110 that are not in first entangled state 122 are remaining particles 180; proceeding, starting with first entangled state 122, to propagate entanglement in a logarithmic progression (e.g., so that a number of particles 110 that are in an entangled state is doubled at every iteration) through remaining particles 180 in a recursive manner, to produce intermediate entangled state 124, such that intermediate entangled state 124 acts as an initial entangled state for a next iteration, until final entangled state 128 is formed to generate the entangled state of particles 110. Here, second entangled state 122 propagates entanglement in a logarithmic progression through remaining particles 180 in a recursive manner by producing intermediate entangled state 124 (shown in step 214), such that intermediate entangled state 124 (of step 214) acts as an initial entangled state for the next iteration in step 216, wherein intermediate entangled state 124 is formed. The process continues recursively, wherein intermediate entangled state 124 formed in step 216 is used as the initial entangled state to form intermediate entangled state 124 shown in step 218. The process continues recursively, wherein intermediate entangled state 124 formed in step 218 is used as the initial entangled state to form intermediate entangled states and eventually penultimate entangled state 126 shown in step 220. Penultimate entangled state 126 of step 220 is used as the initial entangled state to form final entangled state 120 shown in step 222. In this manner, particles 110 obtain final entangled state 128, starting from quantum superposition state 120 of first particle 112 (step 210). With respect to going from 216 to 218 in FIG. 4, three steps rather than one step are involved. The three steps include expanding the size of the entangled volume in each of three directions. Moreover, this action applies to going from 218 to 220 and from 220 to 222 in FIG. 4.

In an embodiment, a process for generating an entangled state 128 of a plurality of particles 110 includes: providing particles 110 that interact via long range interactions; producing quantum superposition state 120 in first particle 112; entangling first particle 112 with second particle 114 to form first entangled state 122, wherein particles that are not in first entangled state 122 are remaining particles 180; and proceeding, starting with first entangled state 122, to propagate entanglement in a logarithmic progression by doubling the number of entangled particles in each iteration through remaining particles 180 in a recursive manner, to produce intermediate entangled state 124, such that intermediate entangled state 124 acts as an initial entangled state for a next iteration, until final entangled state 128 is formed to generate entangled state 128 of particles 110.

Here, particles 110 can include a qudit. As used herein, "qudit" refers to d-level quantum system, wherein d is an integer, e.g., 2, 3, . . . . Exemplary audits include a qubit (a two-level quantum system), qutrit (a three-level quantum system), quartrit (a four-level quantum system), and the like.

Particles 110 can include a nitrogen-vacancy color center, Rydberg atoms, polar molecules, magnetic atoms, and similar d-level quantum systems. Individual members among such particles 110 interact via long-range interaction. Exemplary long-range interactions include a dipole-dipole interaction among particles 110. Particles are arranged in a periodic array, a disordered array, or in domains that include areas that have a periodic array and areas that have a disordered array. Further, particles 110 can be arranged in a one-dimensional array, two-dimensional array, three-dimensional array, or a combination thereof. Particles in three-dimensional arrays interact via long-range interactions that fall off with distance r as $1/r^3$ (such as dipole-dipole interactions), in two-dimensional arrays as $1/r^2$, and in one-dimensional arrays as $1/r$.

In the process for generating entangled state 128, producing quantum superposition state 120 includes preparing a computational basis state (such as $|0\rangle$) and then applying a pulse of electromagnetic radiation to convert this state into a quantum superposition $|0\rangle+|1\rangle$.

Entangling first particle 112 with second particle 114 to form first entangled state 122 (step 212) includes applying pulses of electromagnetic radiation to turn on the interaction between first particle 112 and second particle 114, while keeping the interactions of these two particles with the remaining particles, as well as the interactions between the remaining particles, turned off.

Propagating entanglement in a logarithmic progression through remaining particles 180 includes applying pulses of electromagnetic radiation to turn on the interactions that connect every particle that is already entangled to every particle that is going to be entangled in the next iteration.

Terminating entanglement generation after formation of final entangled state 128 includes applying pulses of electromagnetic radiation to turn off all interactions between particles.

In an embodiment, a process for transferring quantum information among particles 110 includes: providing particles 110 that interact via long range interactions; producing quantum superposition state 120 in first particle 112; entangling first particle 112 with second particle 114 to form first entangled state 122, wherein particles that are not in first entangled state 122 are remaining particles 180; and proceeding, starting with first entangled state 122, to propagate entanglement in a logarithmic progression (doubling the number of entangled particles in each iteration) through remaining particles 180 in a recursive manner, to produce intermediate entangled state 124, such that intermediate entangled state 124 acts as an initial entangled state for a next iteration, until final entangled state 128 is formed to generate entangled state 128 of particles 110 such that the entangled state of all particles, including ultimate particle 116, encodes the initial quantum information from first particle 112; disentangling half of the particles 250 to form first partially disentangled state 310 of all particles, wherein first half of the particles 250 no longer includes the quantum information while second half of the particles 124 remains entangled and carries the quantum information; disentangling half of the remaining entangled particles 252 to form second partially disentangled state 312 of all particles, such that the first three quarters of all particles (250 and 252) no longer include the quantum information and such that the remaining quarter of all particles are remaining entangled particles 124 and carry quantum information; and proceeding, starting with second partially disentangled state of all particles, to propagate disentanglement in a logarithmic progression through remaining entangled particles 124 in a recursive manner, to produce a plurality of intermediate partially disentangled states of all particles (314, 316, 322), such that intermediate disentangled states (e.g. 316) act as initial disentangled states for a next iteration (e.g. 322), until penultimate particle 118 obtains penultimate disentangled state 258 with ultimate particle 116 in the final quantum superposition state 128 with the quantum information, such that the quantum information has been transferred from first particle 112 to ultimate particle 116 in an absence of the quantum information being in particles other than ultimate particle 116.

In an embodiment, with reference to FIG. 5, FIG. 6, FIG. 7, FIG. 8, FIG. 9, and FIG. 10, a process for transferring quantum information in particles 110 arranged in one dimension (FIG. 5), two dimensions (FIG. 6), or three dimensions (FIG. 7, FIG. 8, FIG. 9, and FIG. 10) includes providing particles 110 (step 200) that interact via long range interactions; producing quantum superposition state 120 in first particle 112 (step 210); entangling first particle 112 with second particle 114 to form first entangled state 122 (step 212), wherein particles 110 that are not in first entangled state 122 are remaining particles 180; proceeding, starting with first entangled state 122, to propagate entanglement in a logarithmic progression (e.g., so that a number of particles 110 that are in an entangled state is doubled at every iteration) through remaining particles 180 in a recursive manner, to produce intermediate entangled state 124, such that intermediate entangled state 124 acts as an initial entangled state for a next iteration, until final entangled state 128 is formed to generate the entangled state of particles 110. Here, first entangled state 122 propagates entanglement in a logarithmic progression through remaining particles 180 in a recursive manner by producing intermediate entangled state 124 (shown in step 214), such that intermediate entangled state 124 (of step 214) acts as an initial entangled state for the next iteration in step 216, wherein intermediate entangled state 124 is formed. The process continues recursively, wherein intermediate entangled state 124 formed in step 216 is used as the initial entangled state to form intermediate entangled state 124 shown in step 218. The process continues recursively, wherein intermediate entangled state 124 formed in step 218 is used as the initial entangled state to form intermediate entangled states and eventually penultimate entangled state 126 shown in step 220. Penultimate entangled state 126 of step 220 is used as the initial entangled state to form final entangled state 120 shown in step 222. In this manner, particles 110 obtain final entangled state 128, starting from quantum superposition state 120 of first particle 112 (step 210). Thereafter, first half (250) of the particles are disentangled from entangled state 128 such that the other half of the particles are in intermediate entangled state 124 (step 310). Then (step 312), half (252) of the remaining entangled particles are disentangled from entangled state 124. Disentanglement continues logarithmically (disentangling half of the particles in each iteration) through in a recursive manner in remaining particles until only final particle 116 is left in final quantum superposition state 128 with the quantum information that was initially in first particle 112 now transferred to final particle 116. We note that, in going from 216 to 218 in FIG. 8, one needs to make three (rather than one) steps; these three steps correspond to expanding the size of the entangled volume in each of the three directions. Same comment applies to going from 218 to 220 and from 220 to 222 in FIG. 8, as well as to the disentangling steps going from 222 in FIGS. 8 to 310 in FIG. 9, from 310 to 312 in FIG. 9, and from 312 to 314 in FIG. 9.

Here, first half (250) of the particles are disentangled by applying electromagnetic pulses to turn on interactions between every particle in the first half and every particle in the second half. Half (252) of the remaining entangled particles are subsequently disentangled from intermediate entangled state 124 by applying electromagnetic pulses to turn on interactions between every particle in 252 to the remaining quarter 124 of all particles. Further, propagation of disentanglement occurs by applying electromagnetic pulses to turn on interactions between particles that are about to be disentangled and the particles that will stay entangled after the current iteration. Termination of disentanglement when only final particle 116 is in final entangled state is accomplished by applying electromagnetic pulses to turn off all interactions between particles.

The processes have numerous uses, including speeding up quantum computing and making precise entanglement-enhanced quantum sensors, including sensors of spatially varying fields. According to an embodiment, a process for speeding up quantum computing includes using quantum state transfer to speed up long-range quantum gates by temporarily bringing one qubit state towards another one and applying a nearest-neighbor gate; a process for making precise entanglement-enhanced quantum sensors includes creating the entangled state of all particles in the sensor, subjecting the entangled state to the field of interest, and then making a measurement of the quantum state to deduce the value of the field.

Processes herein have numerous advantageous and unexpected properties. Unexpectedly, for interactions that fall off with distance as $1/r^3$ in 3 dimensional arrangements (a common situations for 3 dimensional arrangements of dipoles), as $1/r^2$ in 2 dimensions, and as $1/r$ in 1 dimension, the processes herein can be used to create an entangled state $|00 \ldots 0\rangle + |11 \ldots 1\rangle$ of linear size L in time logarithmic in L, as well as to send quantum information over a distance L in time logarithmic in L. In contrast, coherent nearest-neighbor interactions cannot accomplish these two tasks in time shorter than linear in L.

The processes herein are illustrated further by the following Examples, which are non-limiting.

EXAMPLES

Example 1. Fast State Transfer and Entanglement Renormalization Using Long-Range Interactions In short-range interacting systems, the speed at which entanglement can be established between two separated points is limited by a constant Lieb-Robinson velocity. Long-range interacting systems are capable of faster entanglement generation. This Example describes a process of transferring a quantum state across a distance L in d dimensions using long-range interactions with strength bounded by $1/r^\alpha$. If $\alpha < d$, the state transfer time is asymptotically independent of L; if $\alpha = d$, the time scales logarithmically with the distance L; if $d < \alpha < d+1$, transfer occurs in time proportional to $L^{\alpha-d}$; and if $\alpha \geq d+1$, it occurs in time proportional to L. We then use this process to upper bound the time required to create a state specified by a MERA (multiscale entanglement renormalization ansatz) tensor network and show that if the linear size of the MERA state is L, then it can be created in time that scales with L identically to state transfer up to logarithmic corrections. This process realizes an exponential speed-up in cases of $\alpha = d$, which could be useful in creating large entangled states for dipole-dipole ($1/r^3$) interactions in three dimensions.

Entanglement generation in a quantum system can occur, even in a non-relativistic setting, by the available interactions. In a lattice system with short-range interactions, there exists a linear light cone defined by a speed proportional to both the interaction range and strength. Suppose two operators A and B are supported on single sites separated by a distance r. Then the Lieb-Robinson bound states that, after time t, $\|[A(t), B]\| \leq c \|A\| \|B\| e^{vt-r}$ where c is a constant, v is another constant known as the Lieb-Robinson velocity, and $\|\cdot\|$ represents the operator norm. If a system initially in a product state begins evolving under a short-range Hamiltonian, correlations decrease exponentially outside of the causal cone defined by r=vt. However, in physical systems including polar molecules, Rydberg atoms, or trapped ions, the interactions fall off with distance r as a power law $1/r^\alpha$. For these interactions, generalizations of the Lieb-Robinson bound are known, but they may not be tight. In addition, for sufficiently long-ranged interactions the causal region may even encompass infinite space at finite time, signaling a breakdown of emergent locality.

These bounds on entanglement have direct implications for quantum information processing. Even if time-dependent control is allowed, the Lieb-Robinson bound limits the speed at which important states for quantum information and metrology can be prepared. Using long-range interactions speeds up quantum state transfer, GHZ state preparation, and MERA (multiscale entanglement renormalization ansatz) construction.

State transfer is a process by which an unknown quantum state on one site in a lattice is transferred to another site which is limited by the Lieb-Robinson bound. A state transfer process uses long-range interactions to transfer a state a distance L on a d-dimensional lattice in time proportional to $L^0$ ($\alpha < d$), log L ($\alpha = d$), $L^{\alpha-d}$ ($d < \alpha \leq d+1$), or L ($\alpha \geq d$). As an intermediate step of the process presented, a GHZ-like state is created, a process also limited by the Lieb-Robinson bound. For polar molecules, Rydberg atoms, or other dipole-dipole interactions in three dimensions, the process yields an exponential speed-up in the rate of entanglement generation.

The fast state transfer using long-ranged interactions can provide a circuit described by a MERA. MERAs are useful ways to represent entangled states such as the ground states of the toric or Haah codes, topological insulators, and quantum Hall states. Using dipole-dipole interactions in 3D, this process constructs the MERA state exponentially faster than using nearest-neighbor interactions.

The state transfer process first creates a many-body entangled state including the intended starting and final qubits. We do so by applying a controlled X rotation between pairs of qubits (i,j) using a Hamiltonian $$H_{ij} = h_{ij}(|0\rangle\langle 0|_i \otimes I_j + |1\rangle\langle 1|_i \otimes X_j). \tag{1}$$

Here $h_{ij}$ is the interaction strength, which may not be identical for all pairs of qubits. Here, take $h_{ij} > 0$. $I_j$ and $X_j$ are the identity and Pauli X operator acting on qubit j. When the Hamiltonian in Eq. (1) is applied for a time $t = \pi/(2h_{ij})$, it realizes a controlled-NOT (CNOT) gate between qubits i and j (up to an unimportant phase). In Eq. (1), i is the control qubit for the CNOT while j is the target qubit. When applied to a control qubit in an arbitrary state and a target qubit in the state $|0\rangle$, the CNOT gate results in a two-qubit state encoding the original qubit, $$\text{CNOT}(a|0\rangle + b|1\rangle)|0\rangle = a|00\rangle + b|11\rangle. \tag{2}$$

By continuing this process, we can create a many-body entangled state of N qubits $a|0\rangle^{\otimes N} + b|1\rangle^{\otimes N}$ encoding the same state as the initial qubit. The original state can be transferred onto the target qubit by reversing the entangling process and leaving the destination qubit as the final control qubit. $H_{ij}$ were a nearest-neighbor Hamiltonian, then this procedure would then allow us to transfer a qubit state a distance L in $\mathcal{O}(L^a)$ operations, providing a linear scaling which saturates the Lieb-Robinson bound.

By using Hamiltonians with long-range interactions, we can achieve a sublinear state transfer time. We suppose that $h_{ij=1}/r_{ij}^\alpha$, where $r_{ij}$ is the distance between the qubits i and j. Our process (FIG. 11) starts by acting on all qubits in the lattice with a single control qubit storing the initial state. Once the CNOT operation completes on a qubit, it can be switched from a target to a control and then used to speed up the CNOTs which are still continuing on other qubits. If a single qubit is targeted by many control qubits, then the CNOT operation on that qubit can be completed faster. (Multiple $H_{ij}$ will mutually commute as long as the sets of target qubits and control qubits are disjoint.) If qubit j is targeted by many qubits indexed by the time required to complete the CNOT becomes $$t = \frac{\pi}{2\sum_i h_{ij}} = \frac{\pi}{2\sum_i r_{ij}^{-\alpha}}. \tag{3}$$

By using dimensionless couplings $h_{ij} = 1/r_{ij}^\alpha$, we are implicitly giving times in units of the inverse nearest-neighbor coupling strength. In addition to the progressive inclusion of more control qubits, each subsequent qubit has already been rotated by some angle, reducing the remaining time required to complete the operation. As an example, consider beginning with a system of three qubits arranged in a line, $$|\psi(t=0)\rangle = (a|0\rangle + b|1\rangle)|00\rangle \tag{4}$$

Simultaneously applying $H_{12}$ and $H_{13}$ for a time $t_1 = \pi/2$, the state becomes $$|\psi(t_1)\rangle = a|000\rangle - ib|11\rangle\left(\cos\frac{\pi}{2^{\alpha+1}}|0\rangle - i\sin\frac{\pi}{2^{\alpha+1}}|1\rangle\right). \tag{5}$$

At this point, the second qubit is made a control, so that the acting Hamiltonians are $H_{13}$ and $H_{23}$. By continuing the evolution under these Hamiltonians for an additional time, $$t_2 = \frac{\frac{\pi}{2} - \frac{\pi}{2 \cdot 2^\alpha}}{1 + \frac{1}{2^\alpha}} = \frac{\text{rotation remaining}}{\text{sum of interactions}}, \quad (6)$$

the system will end in the final state $$|\psi(t_1+t_2)\rangle = a|000\rangle - b|111\rangle. \quad (7)$$

The entire procedure can be reversed, interchanging the roles of qubits 1 and 3, to transfer the original state, $$|\psi(2(t_1+t_2))\rangle = |00\rangle(a|0\rangle + b|1\rangle). \quad (8)$$

Figure 11:
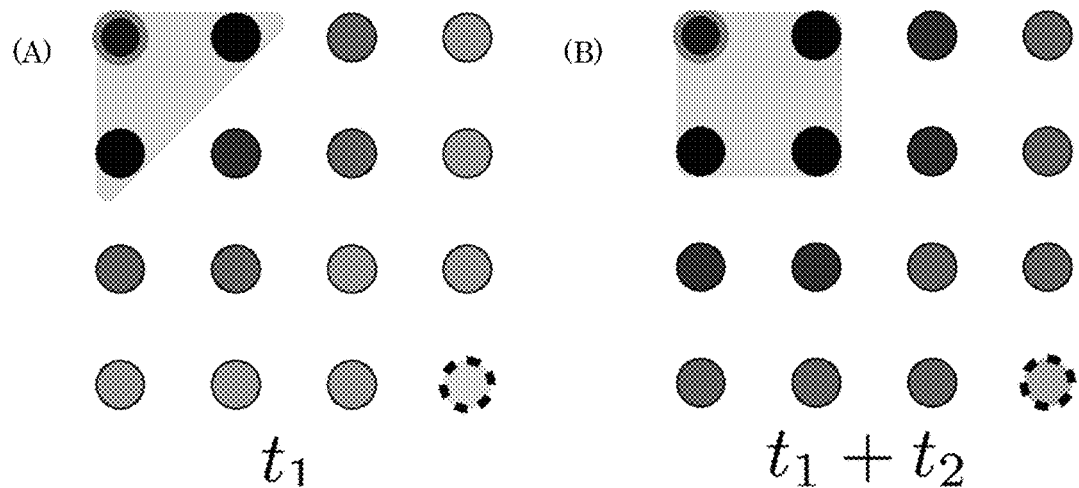
FIG. 11 shows a state transfer process using long-range interactions. A qubit state is moved from the upper-left site to the lower-right position. After a time $t_1$ (a), the nearest-neighbor qubits have shifted from target to control (darker region) and continue acting on all other qubits, thereby adding an additional qubit to the set of controls after further time $t_2$, as shown in (b). After $t_2$, each qubit has rotated further (shown by even darker shading). Transfer continues until the original qubit has effectively performed a CNOT on all qubits in the lattice shown.
Figure 12:
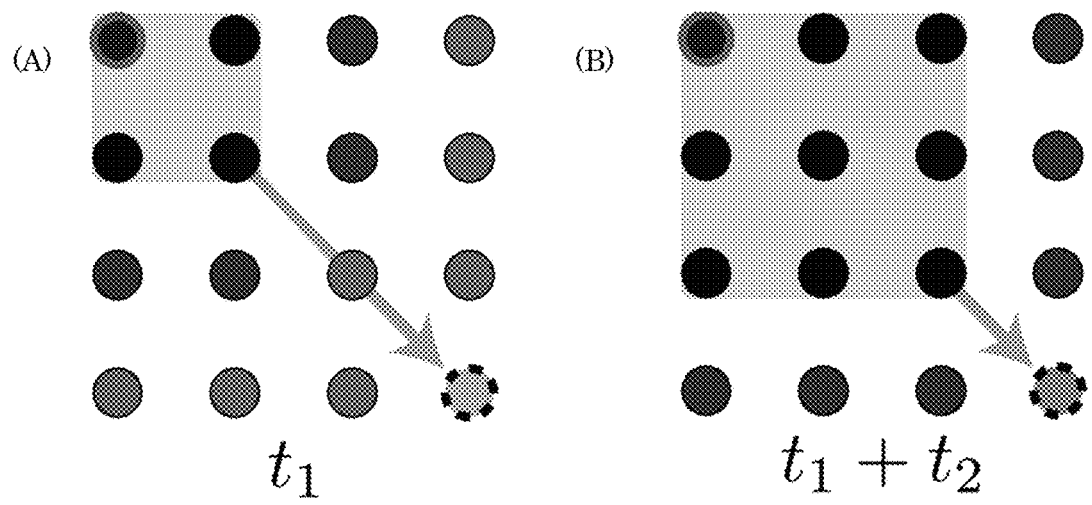
FIG. 12 (a) shows a process used for bounds with the same color scheme as FIG. 11. After the pth time step, a $(p+1) \rightarrow (p+1)$ hypercube of qubits act as controls. The arrow represents H(2,3), as it connects a $2 \rightarrow 2$ square to a qubit at coordinates (3,3). (b) After time $t_1+t_2$ another set of qubits has been converted from targets to controls. The arrow now represents H(3,3).

We now consider the case of many qubits. First, we specify that we aim to construct a GHZ state across a hypercube whose diagonal spans a distance $L\sqrt{d}$. The points on either end of the diagonal are the original and destination sites for state transfer (see FIG. 12) Because the state transfer time using the process of FIG. 11 is difficult to compute, we use a slightly slower process that allows us to easily estimate the transfer time both analytically and numerically. Rather than change a qubit into a control as soon as its evolution completes, we instead halt a qubit's evolution when its rotation finishes. Once we have enough qubits to form a full hypercube of controls, we expand the control set and continue evolution. This scheme is illustrated in FIG. 12, and we expect it to perform similarly (in terms of the scaling of transfer time) to the scheme in FIG. 11. Let $q=1,2,\ldots,L$ denote each subsequent expansion of the hypercube, so that after time $t=t_1+t_2\ldots+t_q$ we can form a complete control hypercube of edge length q. The times $t_q$ are determined by the condition that each qubit must accumulate a total phase of $\pi/2$, $$\sum_{p=1}^{q} H(p,q) t_p = \frac{\pi}{2}. \quad (9)$$

Here $H(p,q)$ is defined to be the summation of all Hamiltonian strengths $h_{ij}$ for which the control i is in the hypercube with corners $(0,0,0,\ldots)$ and $(p-1, p-1, \ldots)$ and the target j is at the site $(q, q, q, \ldots)$ at the corner of a larger hypercube containing the first, as illustrated in FIG. 12. The qubit j is the slowest-evolving qubit on its layer, so its evolution determines the time required to expand the cube in this scheme.

At this point, we will begin looking for bounds on the times $t_q$. Our first bound arises by noting that for all p, $t_p > t_{p+1}$. This is because, for each p, the quantity $H(p,p)$ is strictly larger than $H(p-1, p-1)$–the qubit at $(p, p, \ldots, p)$ has more qubits acting on it than its counterpart in the previous step. We use $t_p > t_{p+1}$ to rewrite the phase condition on times in Eq. (9), $$\frac{\pi}{2} \geq t_q \sum_{p=1}^{q} H(p,q). \quad (10)$$

We now construct two complementary bounds for $H(p,q)$. In some cases (small $\alpha$), $H(p,q)$ will receive appreciable contributions from the entire hypercube of control qubits. In this case, we can obtain a lower bound by pretending that all control qubits are at the same point a distance $q\sqrt{d}$ away, the maximum possible. However, for large $\alpha$ the interaction is dominated by nearby qubits, whose contributions are independent of q. For instance, in $H(q,q)$ there is always one qubit at the nearest vertex of the hypercube whose contribution does not depend on q. These two bounds can be combined to yield:

$$H(p,q) \geq \max\left(\frac{p^d}{(q\sqrt{d})^\alpha}, \frac{\delta_{pq}}{d^{\frac{\alpha}{2}}}\right). \quad (11)$$

If we discard all constants depending only on d or $\alpha$, the result is a bound on the scaling of $t_q$, $$t_q \leq \min(q^{\alpha-(d+1)}, 1). \quad (12)$$

Figure 13:
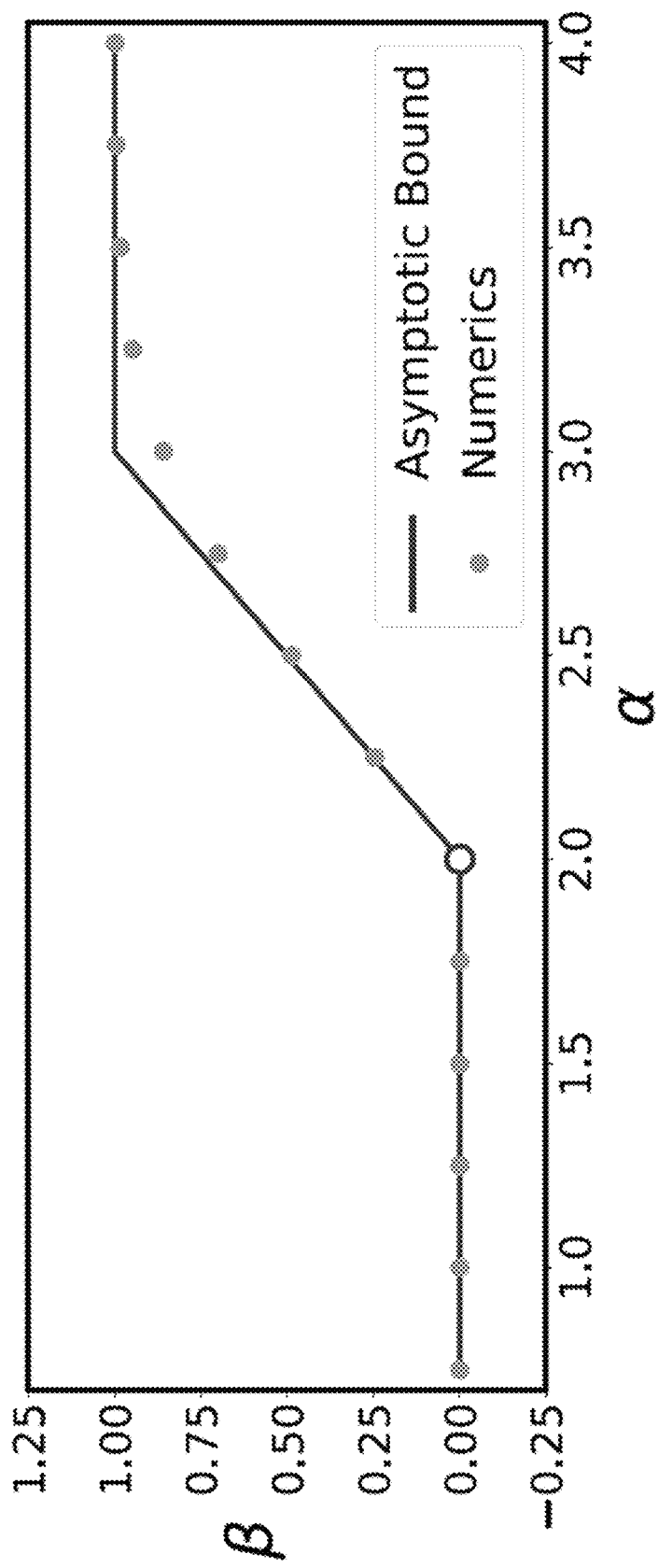
FIG. 13 shows is a graph of beta versus alpha.

To obtain the scaling of the entire state transfer process, a sum over $t_q$ is made up to $q=L$. For $\alpha < d$, $t_q$ grows more slowly than $(q^{-1}$, so the sum converges to a constant for asymptotic q. The convergence signals that a state can be transferred any desired distance in a constant time. For $\alpha=d$, $t_q = q^{-1}$, so the sum scales logarithmically in L. For $d < \alpha < d+1$, we obtain a polynomial scaling $L^{\alpha-d}$. Finally, for $\alpha \geq d+1$, the constant lower bound on $t_q$ dominates, and state transfer takes a time proportional to L, just as it does for short-range interacting systems. These scalings are illustrated in FIG. 13 along with the exponents of polynomial fits to the numerical solutions of Eq. (9). Direct use of the long-range interaction between the initial and target qubits would require a time $\mathcal{O}(L^\alpha)$ to achieve state transfer. Note that our Hamiltonians always obey the condition that $|h_{ij}| \leq r_{ij}^{-\alpha}$, e.g., in speed limits in long-range interacting systems.

Figure 14:
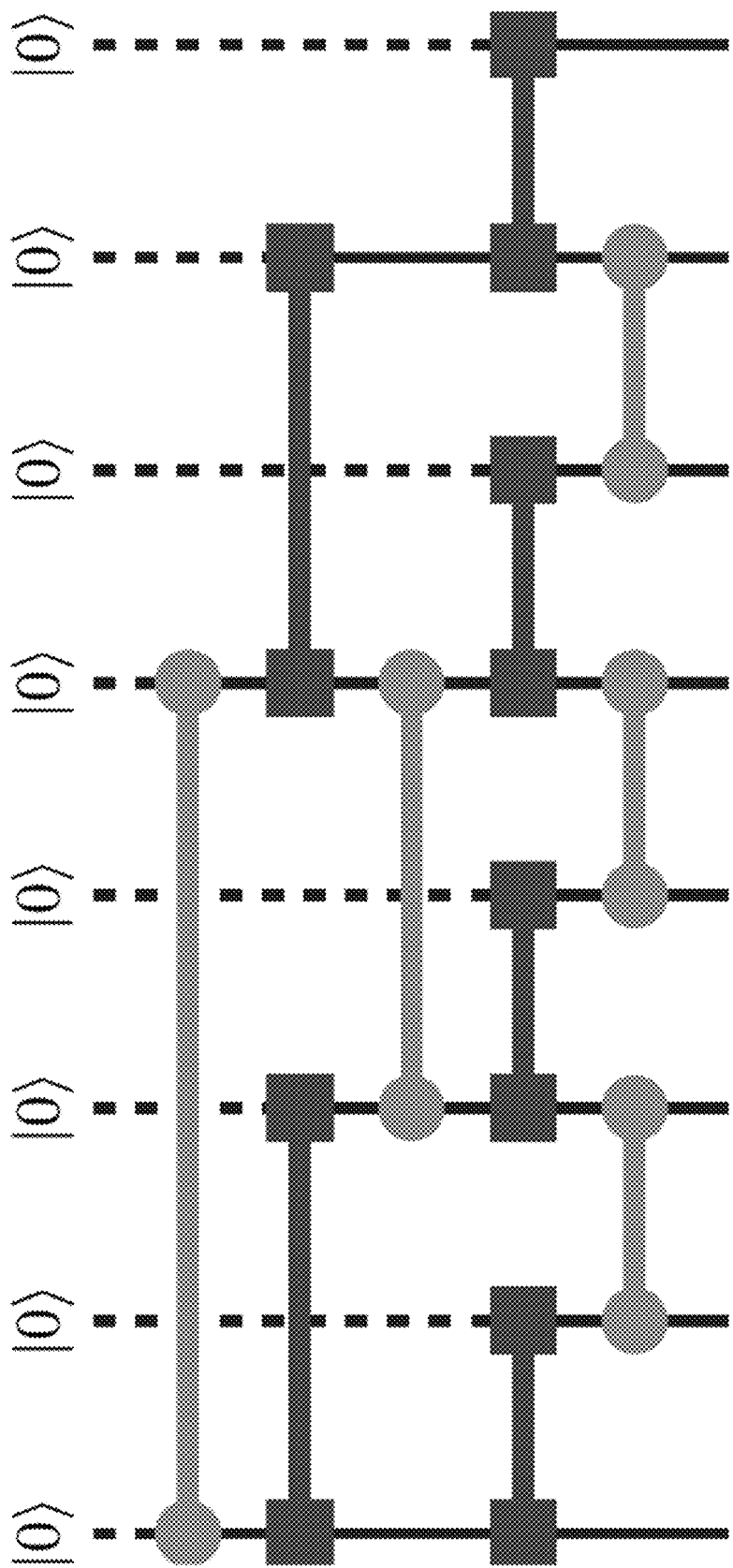
FIG. 14 shows a MERA circuit for disentanglers (circle-capped) and isometries (square-capped), wherein qubits begin in the state |0i, indicated by a dashed line. At each length scale, entanglement is created or removed to create a many-body entangled state from a product state after $\log_2 L$ steps.

We now demonstrate that our state transfer process allows for fast construction of a MERA. In this context, we will interpret a MERA as a quantum circuit for qubits which acts on successively larger length scales, as shown in FIG. 14, to produce an entangled state from a product state. More general constructions are possible (e.g. with qudits). Our process will also apply to a branching MERA provided that after a constant number of layers the circuit disentangles a constant fraction of the remaining qubits to $|0\rangle$, which we need to use to perform our state transfer process. A MERA consists of two alternating types of unitary operations and is easiest to understand in reverse (starting at the bottom of the circuit). The first type of unitary, called a disentangler, removes entanglement at the current length scale. The next operation, an isometry, maps a group of $\phi$ sites into a single site, leaving the other qubits in the state $|0\rangle$. These operations can be repeated, except that now all unitary gates need to be performed over a distance times larger than previously.

MERA produces a circuit with depth $\log_\phi L$, but this apparent logarithmic scaling masks an actual time cost due to the continuously increasing length scale. However, we can replace a long-range two-qubit unitary with state transfer followed by a short-range unitary. The structure of a MERA circuit guarantees that the $|0\rangle$ states required to perform state transfer will be present between any two qubits when we need to perform a unitary on them.

Suppose that $t_\tau$ is the maximum time required to perform a two-qubit gate across a distance $\ell_\tau$ at the $\tau$th step of the MERA circuit. We can perform all the MERA operations at a given step in parallel, so a single layer of the MERA simply requires time $2t_\tau$ for the disentanglers and then isometries. The time to perform the entire MERA circuit will then be bounded (up to a constant factor) by $$t_{MERA} \lesssim \sum_{\tau=0}^{S-1} t_\tau. \quad (13)$$

Here $S=\log_\phi L$. Our state transfer procedure allows for $t_\tau = 2t_{transfer}$. The time required to perform the final two-qubit gate does not affect the scaling and so is omitted. We can then bound $t_{transfer}$ by considering the length scale at each step, $\ell_\tau = \phi^\tau$. If $\alpha=d$, $t_{transfer}$ scales as $\log_\phi \ell_\tau$ (as in our state transfer bound but with a constant multiple changing the base of the logarithm), and $t_{MERA}$ will be bounded by $\sim(\log_\phi L)^2$ by considering the largest term in Eq. (13) multiplied by the number of terms. For $\alpha \neq d$, $t_{transfer}$ scales polynomially in $\ell_\tau$ with exponent $\beta$, $t_{MERA} \lesssim \Sigma \ell_\tau^\beta$. For $\alpha<d$, $\beta=0$ and the sum is proportional to $\log_\phi L$. For $\alpha>d$, $\beta$max $(\alpha-d, 1)$. We use $\ell_\tau = \phi^\tau$ and carry out the geometric sum to obtain $t_{MERA} \lesssim L^\beta$. Thus, we have the conditions listed in the Table.

TABLE

| $\alpha$ | $\alpha < d$ | $\alpha = d$ | $d < \alpha \leq d + 1$ | $\alpha > d + 1$ |
|---|---|---|---|---|
| $t_{MERA}$ | $\log_\phi L$ | $(\log_\phi L)^2$ | $L^{\{\alpha-d\}}$ | $L$ |

We have demonstrated fast state transfer and MERA construction process using long-range interactions. Our process's exponential speedup for $\alpha=d$ nearly saturates the bound in, which gives a logarithmic lightcone for $\alpha>d$. The state transfer process we have presented establishes that no finite causal region is possible for $\alpha<d$, since a constant amount of time suffices to establish any desired correlation at arbitrary distances. We have shown that such causal regions do not persist in general.

For the intermediate value $d<\alpha<d+1$, our process shows that no linear light cone can be drawn, although a polynomial bound may be possible. Our process's linear scaling when $\alpha \geq d+1$ suggests that the tightest possible Lieb-Robinson bound may also possess a critical a with a similar property. Resolving this question could reveal important facts about the nature of correlations in long-range interacting systems.

This process offers significant technological advantages in, for instance, entanglement-enhanced metrology. Dipole-dipole interactions in three dimensions can be used to implement the process, including Rydberg atoms. Qubits can be entangled exponentially faster than using short-range interactions.

Example 2. Fast State Transfer and Entanglement Renormalization in Dipole-Dipole Interactions Equations in this Example are numbered beginning with Equation 1.

Rydberg atoms can be made to interact with a dipole-dipole interaction that has distance dependence $1/r^3$. Using our process, we could produce a cube of side length L in a GHZ state in time proportional to log L. A physical interaction yields this result. Our analysis is focused on Rydberg atoms, but much of it should extend to other dipolar systems, such as polar molecules.

We select as qubit states the ground state and a highly excited state of a Rydberg atom under a weak electric field, yielding a purely diagonal atomic interaction. The Hamiltonian of a system of such atoms can be written as:

$$H_{int} = \sum^{i \neq j} H_{ij} = \sum^{i \neq j} \frac{1 - 3\cos^2 \theta_{ij}}{r_{ij}^3} Z_i Z_j \equiv \sum^{i \neq j} V_{ij} Z_i Z_j. \quad (1)$$

Here, $r_{ij}$ is the distance between atoms i and j, while $\theta_{ij}$ is the angle between the electric field and the vector separating the two atoms. We have ignored local terms like $Z_i$ and $Z_j$, which can be removed by applying local rotations. By applying local rotations, this ZZ Hamiltonian can be used to realize CNOT interactions, regardless of whether the overall sign is positive or negative. This is done by applying local rotations to produce a controlled-phase gate and applying Hadamard operations on the target before and after the evolution to yield a controlled-NOT gate. We assume that, while local control fields may be time-dependent, the two-body interaction in Eq. (1) is active throughout the entire state transfer process. The individual addressing included performing local operations demonstrated in a 3D optical lattice. The roughly 5 μm lattice spacing in that work is also an appropriate spacing for the Rydberg interactions we intend to use in our process, as it helps to prevent the dipole-dipole interactions from becoming comparable to the energy level spacing.

Qubits can be separated into controls and targets. Such separation can be performed using an echoing procedure: first, qubits evolve under $H_{int}$ and then under $-H_{int}$ for an equal amount of time. However, halfway through the second evolution, a π-pulse (x gate) is applied to either all target qubits or all control qubits. This has the effect of swapping Z for $-Z$. All interactions between controls and controls, or targets and targets, will remain unchanged, but any control-target interactions will be inverted. Thus, during the $-H_{int}$ time, control-target interactions experience no net evolution, while any control-control or target-target pair evolution due to $+H_{int}$ is undone. The $-H_{int}$ evolution time is equal to the initial entangling $+H_{int}$ time, so the echoing procedure does not change the scaling with L. Even if the negative interaction is not of the same magnitude as the original, we can still accomplish the echoing by adjusting the timescales, and the scaling with L will still not be changed.

To change the sign of the dipole-dipole interaction, realizing $-H_{int}$, we can encode the computational states into the fine structure of a Rydberg atom. For specificity, we consider the case of $Rb^{87}$ with a weak applied electric field. Ignoring the hyperfine structure, we encode the state $|0\rangle$ in a superposition of $|L=0, J=1/2, m_J=1/2\rangle$ and $|L=1, J=3/2, m_J=3/2\rangle$ created by applying a microwave dressing field, with most of the amplitude being stored in the latter state. The state $|1\rangle$ is then encoded in $|L=1, J=1/2, m_J=1/2\rangle$. All three states have the same principal quantum number. We are also dropping local Z terms which can be canceled by a local rotation. We have calculated dipole matrix elements for $Rh^{87}$ across a wide range of principal quantum numbers that confirm this scheme remains viable in the Rydberg setting. We also assume that, in addition to changing the overall sign of the interaction, we are able to place qubits in non-interacting electronic ground states to avoid any unwanted interactions or decay from excited states.

If a volume of control qubits exists, this volume will convert a qubit j into a control after time $\pi/2V_j$, where $V_j$ is the sum over all interaction constants $V_{ij}$ for control qubits i. Suppose that enough qubits have been added that the sum of point-to-point interactions is well-approximated by an integral, which is a good approximation in the relevant asymptotic regime. The total interaction on a qubit j in this case can be written as $$V_j = \int_C V_{ij} dC. \qquad (2)$$

Here, C is the volume of control qubits. This quantity has the useful property of scale invariance. If all lengths change by a factor $\lambda$, then $H_{int}$ changes by the factor $\lambda^{-3}$ due to its distance dependence. However, the region of integration expands by $\lambda^3$, so the final quantity remains unchanged.

We consider expanding a cube of controls, increasing the side length $\ell$ by a constant factor $\lambda$. After this procedure, we obtain a new cube of side length $\lambda \ell$. Qubits outside of the larger cube have no operations performed on them. Once this expansion has been performed, we expand the cube again. Due to scale invariance, the same operation can be performed in identical time. This means that after n expansion steps, the side length will be $\lambda^n \ell$. Therefore, we can construct a cube of side length L in a time proportional to $\log_\lambda(L/\ell)$ as indicated in the main text. The scaling properties of the integral in Eq. (2) can be used in cases where $\alpha \neq d$ as well. Equation (2) implies that the time required to construct a cube of side length L will be:

$$t_{GHZ} \sim \sum_{i=1}^{\log_\lambda(\frac{L}{\ell})} \lambda^{n(\alpha-d)}. \qquad (3)$$

For $\alpha < d$, this saturates to a number independent of L, and for $\alpha > d$, it implies that $t_{GHZ} \sim L^{\alpha-d}$. Note that for $\alpha > d+1$, a process of successive dilations of the cube fails to provide optimal scaling.

Figure 15:
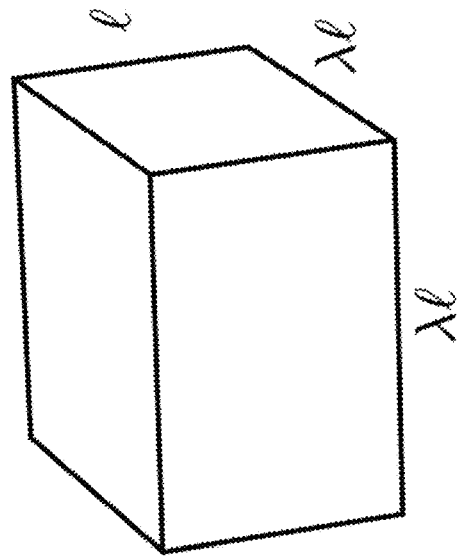
FIG. 15 shows successive transformations of a control queue. The control cube side length L is expended first in one direction then subsequent directions.
Figure 15:
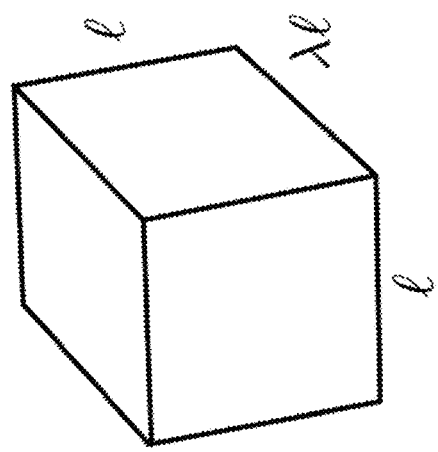
Figure 15:
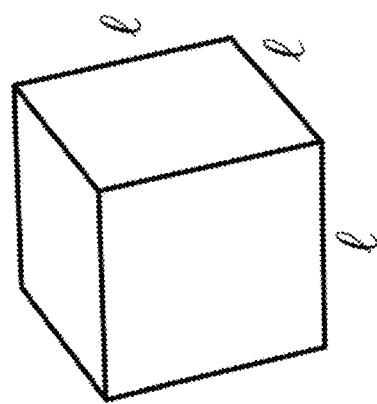

The size of the cube can be increased by a constant factor in finite time. The dipole-dipole interaction changes sign as a function of $\theta_{ij}$, causing $V_j$ to be zero for qubits at some points. If we could only act with the control cube during the expansion time, we would not be able to perform the expansion as outlined above. However, we can use a slightly more complicated scheme in which some intermediate qubits are used. Rather than expand the entire cube at once, we expand the cube outward in the positive x-, y-, and z-directions successively, each time expanding only to qubits which lie on lines perpendicular to the expanding face of the rectangular prism, as illustrated in FIG. 15. This works because the interaction can be shown to decrease monotonically (in absolute value) along Cartesian directions, as we prove below. Since at long distances we know that the interaction decays to zero and has the same sign for all target qubits, the monotonicity establishes that there is no zero crossing. As there is no zero crossing, there will be a finite time that suffices to complete the expansion. The logarithmic scaling follows.

Proof of Interaction Monotonicity.

Figure 16:
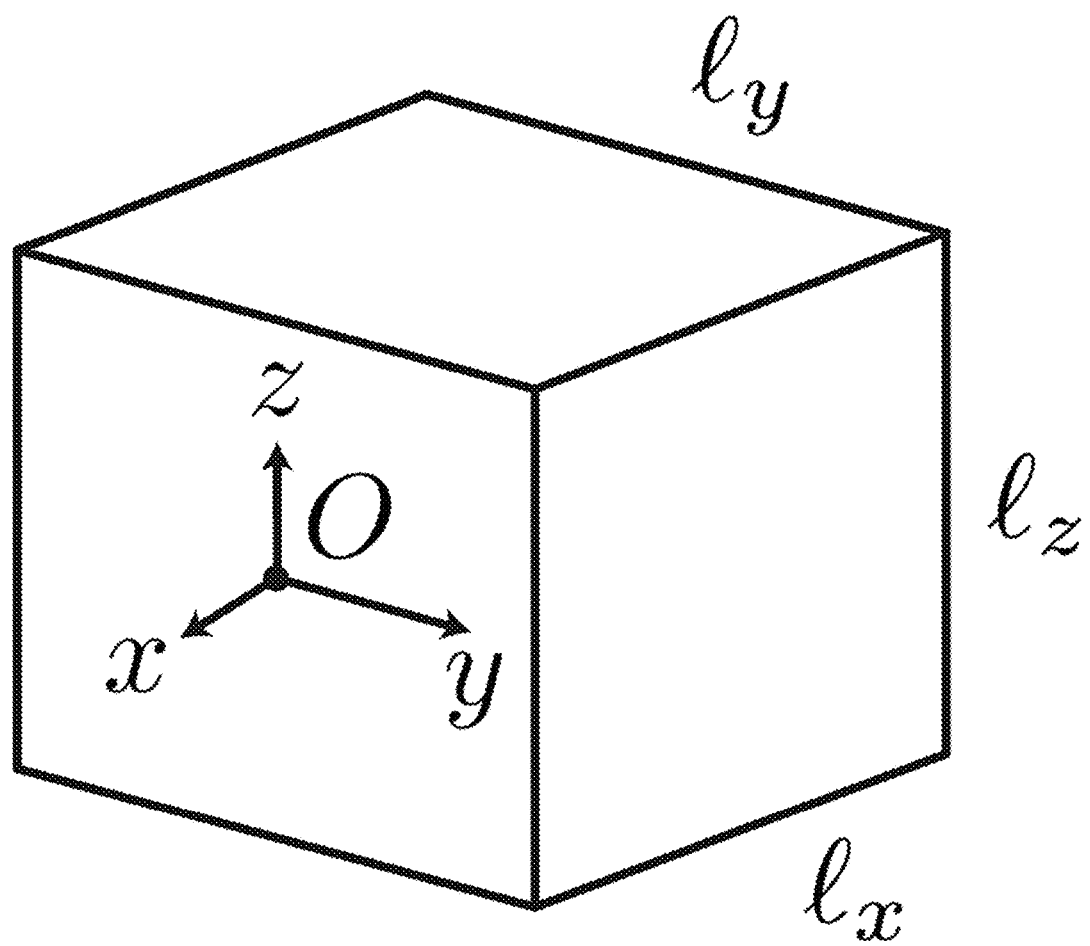
FIG. 16 shows a coordinate system for transfer of quantum information.

We will now prove that the interaction between a cube of controls and a target qubit decreases monotonically in Cartesian directions. Suppose we begin with a rectangular prism located in the y-z plane with dimensions $\ell_x \times \ell_y \times \ell_z$ and the origin in the center of one face (see FIG. 16 for an illustration). A qubit at point (x,y,z) then has the interaction integral $$V = \int_x^{x+\ell_x} \int_{-\ell_y/2+y}^{\ell_y/2+y} \int_{-\ell_z/2+z}^{\ell_z/2+z} \frac{x'^2 + y'^2 - 2z'^2}{(x'^2 + y'^2 + z'^2)^{5/2}} dx' dy' dz'. \qquad (4)$$

The integrand in Eq. (4) is simply the dipole interaction written in Cartesian coordinates. We choose y and z to fall in $(-\ell_y/2, \ell_y/2)$ and $(-\ell_z/2, \ell_z/2)$ respectively to ensure that their projection to the y-z plane lies on the face of the prism. We consider only positive values of y and z without loss of generality. The derivative of V with respect to x can be expressed analytically as $$\partial_x V = D\left(-\frac{\ell_y}{2}+y, -\frac{\ell_z}{2}+z\right) + D\left(\frac{\ell_y}{2}+y, \frac{\ell_z}{2}+z\right) - \qquad (5)$$
$$\left[D\left(-\frac{\ell_y}{2}+y, \frac{\ell_z}{2}+z\right) + D\left(\frac{\ell_y}{2}+y, -\frac{\ell_z}{2}+z\right)\right],$$

$$* D(a,b) = ab\left(\frac{1}{((x+\ell_x)^2+c^2)\sqrt{(x+\ell_x)^2+a^2+c^2}} - \frac{1}{(x^2+c^2)\sqrt{x^2+a^2+c^2}}\right). \qquad (6)$$

For D(a,b), the sign is always determined by the prefactor because the factor in parentheses is strictly negative. Using the fact that y and z must be less than $\ell_y/2$ and $\ell_z/2$ respectively, we can assign a negative sign to the first two D to appear in Eq. (5) and a positive sign to the second two. Therefore, we find that $\partial_x V$ is always negative in this region, establishing the monotonicity for expansion along one face in the x-direction. This proof also holds for the y-direction immediately from symmetry. For the z-direction, a similar argument holds but with a more complicated parenthetical term in $D(\alpha, b)$.

Effects of Decoherence

In the next two sections, we will consider the influence of experimental imperfections in qubits and gate operations and examine the implication for our process's scalability. First, we will consider the influence of decoherence, for instance, due to spontaneous emission out of the Rydberg excited states. The fragile nature of the GHZ state means that a single emission can cause our process to fail. We assume that individual qubits fail (spontaneously emit) at a rate $\gamma$. This analysis should extend to any similar failure mechanism that occurs at a constant rate. If each expansion step (dilating the cube by $\lambda$) takes time $\delta t$, then we can consider whether, in the ith timestep, any of the $\lambda^{3i}$ qubits currently involved emit. If so, we label the step a success. The process succeeds if all of its individual steps succeed. The probability that no spontaneous emissions occur at any of $N_t$ time steps and that the process succeeds is $$P(\text{success}) = \prod_{\{i=1\}}^{\{i=Nt\}} P(\text{success at step } i) = \exp\left(-\gamma \delta t \sum_i \lambda^{[3i]}\right) \qquad (7)$$

If we demand that the process successfully entangle N qubits with a probability $P > \epsilon$, then. Eq. (7) becomes $$\sum_{i=1}^{\log_\lambda N^{1/3}} \lambda^{3i} = \frac{\lambda^3(N-1)}{\lambda^3-1} < \frac{\ln\frac{1}{\epsilon}}{\gamma \delta t}. \qquad (8)$$

This suggests a limit on the number of qubits which can be entangled with a system of decohering qubits, which we write as $$N_{lr} < 1 + \frac{\ln\frac{1}{\epsilon}}{\gamma\delta t}\frac{\lambda^3-1}{\lambda^3}. \quad (9)$$

Here $N_{lr}$ refers to the number of qubits that can be entangled using our long-range interacting process. Note that if $\epsilon$ and $\lambda$ are taken to be of order 1, Eq. (9) simply implies that $N_{lr}\gamma\delta_t \lesssim 1$, which is unsurprising since our largest entangled state decays in a time $1/N_{lr}\gamma$. We can also consider what this limit looks like in the case of a process which uses nearest-neighbor interactions and, at each step, increases the cube's side length by one. In this case, the ith timestep has $i^3$ qubits entangled, and there are $N^{1/3}$ such steps. A similar argument to the above leads us to calculate $$\sum_{i}^{N^{1/3}} i^3 = \frac{1}{4}[N^{4/3} + 2N + N^{2/3}] < \frac{\ln\frac{1}{\epsilon}}{\gamma\delta t}. \quad (10)$$

If we assume we're interested in cases where N is somewhat large a priori, then we write the following loose bound by dropping strictly positive terms:

$$N_{nn} < \left(\frac{4\ln\frac{1}{\epsilon}}{\gamma\delta t}\right)^{3/4}. \quad (11)$$

Here the exponent 3/4 arises because we summed over $N^{1/3}$ terms like $i^3$, yielding $N^{4/3}$ and then inverted that. Suppose we take $\lambda=2$, in which case the first step of each process is the same and we can equate the two $\Delta t$. Then the ratio of the two thresholds is $$\frac{N_{lr}}{N_{nn}} = \frac{7}{16\sqrt{2}}\left(\frac{\ln\frac{1}{\epsilon}}{\gamma\delta t}\right)^{1/4}. \quad (12)$$

To evaluate this figure of merit, we can look at the original proposal for interaction-based Rydberg gates, which suggests a two-qubit gate timescale of less than a nanosecond. Our process also requires several one qubit gates in each step, which can also be accomplished on nanosecond timescales using pulsed lasers. Estimating $\delta t \sim 5$ ns, demanding a success probability of 1/2, and taking the Rb[87] 100s state lifetime of 340 μs at a temperature of 300K, we find that $N_{lr}/N_{nn} \approx 4.5$, meaning that a long-range process can achieve a maximally entangled state containing nearly 4.5 times as many qubits as one constructed by nearest-neighbor interactions. This figure rises to 4.9 if we solve Eq. (12) directly rather than using the bound. $N_{lr}$ is about $4\times10^4$, suggesting a lifetime for the GHZ state of roughly 8 ns. Using $\delta t$ and $N_t = \log_\lambda N_{lr}^{1/3}$, we find that constructing such a state would require a total time of about 25 ns.

To estimate the probability of performing state transfer instead of constructing the GHZ state, one must simply replace $\epsilon$ with $\sqrt{\epsilon}$ in the above analysis, as a state transfer success is effectively just two successful iterations of the GHZ construction. After state transfer is performed, we can ask whether it survives long enough to be read out or transferred into a noninteracting level. Since the single-atom lifetime of the Rydberg state is 340 μs, this should not be an issue as the time required to complete the transfer is on the order of tens of nanoseconds. Once transfer or GHZ creation is complete, the electric field can be turned off to remove the dipole-dipole interaction in Eq. (1).

Effects of Imperfect Single-Qbit Gates

In addition to free evolution under the long-range interaction Hamiltonian [Eq. (1)], our process requires a number of single-qubit gates to be performed. These can be Hadamard gates which produce the CNOT operation out of our ZZ interaction or the echoing pulses. In any case, a failure of the single-qubit gate can pose a serious problem to the process. Suppose we perform N single-qubit gates which succeed with a probability P. Then, as in the previous section, we demand that the gate sequence succeed with probability $\epsilon$, obtaining $$P^{N_s} > \epsilon \Rightarrow P > e^{(\ln \epsilon)/N_s}. \quad (13)$$

The number of single qubit gates which must be targeted on a qubit in a timestep varies depending on that qubit's role during the step, but let us suppose that on average there are c gates per qubit performed on each of $N_t$ timesteps. We can count number of qubits involved in each timestep just as we did in Eq. (8) to obtain a criterion for success:

$$P > e^{(\ln \epsilon)/(c\lambda^3(N-1)/(\lambda^3-1))}. \quad (14)$$

Composite pulse sequences for atomic qubits suggests achievable fidelities of $1-10^{-4}$. If we assume $c=4$ as an estimate, $\epsilon=1/2$, and $\lambda=2$, Eq. (14) suggests that roughly 1500 qubits could be entangled with such gates using our process. This is a reduction of several orders of magnitude from the previous section which considered no single-qubit fidelity issues.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A process for generating an entangled state of a plurality of particles, the process comprising:
   providing the plurality of particles, the plurality of particles interacting via long range interactions;
   producing a quantum superposition state in a first particle;
   entangling the first particle with a second particle to form a first entangled state, wherein particles that are not in the first entangled state are remaining particles; and
   proceeding, starting with the first entangled state, to propagate entanglement in a logarithmic progression by doubling a number of entangled particles in each iteration through the remaining particles in a recursive manner, to produce an intermediate entangled state, such that the intermediate entangled state acts as an initial entangled state for a next iteration, until a final entangled state is formed to generate the entangled state of the particles.

2. The process of claim 1, wherein the particles comprise a qudit.

3. The process of claim 2, wherein the qudit comprises a qubit.

4. The process of claim 2, wherein the qudit comprises a qutrit.

5. The process of claim 1, wherein the particles comprise a nitrogen-vacancy color center.

6. The process of claim 1, wherein the particles comprise Rydberg atoms.

7. The process of claim 1, wherein the particles comprise polar molecules.

8. The process of claim 1, wherein the particles comprise magnetic atoms.

9. The process of claim 1, wherein the long-range interaction comprises a dipole-dipole interaction among the particles in a three-dimensional arrangement.

10. The process of claim 1, wherein the particles are arranged in a periodic array.

11. The process of claim 1, wherein the particles are arranged in a disordered array.

12. The process of claim 1, wherein the particles are arranged in a one-dimensional array, a two-dimensional array, or a three-dimensional array.

13. A process for transferring quantum information among a plurality of particles, the process comprising:
   providing the plurality of particles, the plurality of particles interacting via long range interactions;
   producing a quantum superposition in a first particle comprising the quantum information to be transferred;
   entangling the first particle with a second particle to form a first entangled state, wherein particles that are not in the first entangled state are remaining particles;
   proceeding, starting with the first entangled state, to propagate entanglement in a logarithmic progression by doubling a number of entangled particles in each iteration through the remaining particles in a recursive manner, to produce an intermediate entangled state, such that the intermediate entangled state acts as an initial entangled state for a next iteration, until a final entangled state is formed to generate the entangled state of the particles, such that all particles in the entangled state comprise the quantum information from the first particle;
   disentangling the first half of the particles to form a first partially disentangled state of all particles, wherein the first half of the particles are disentangled and no longer comprise the quantum information, while the second half of the particles remain entangled and comprise the quantum information;
   disentangling half of the remaining entangled particles to form a second partially disentangled state of all particles, wherein the first three quarters of the particles are now disentangled and no longer comprise the quantum information while the remaining quarter of the particles remain entangled and comprise the quantum information; and
   proceeding, starting with the second partially disentangled state, to propagate disentanglement in a logarithmic progression by halving the number of entangled particles in each iteration through the remaining entangled particles in a recursive manner, to produce a plurality of intermediate partially disentangled states, such that the intermediate partially disentangled states act as initial partially disentangled states for a next iteration, until a penultimate particle is disentangled with the ultimate particle in the final entangled state with the quantum information, such that the quantum information has been transferred from the first particle to the ultimate particle in an absence of the quantum information being in particles other than the ultimate particle.

14. The process of claim 13, wherein the particles comprise a qudit.

15. The process of claim 14, wherein the qudit comprises a qubit or a qutrit.

16. The process of claim 13, wherein the particles comprise a nitrogen-vacancy color center, Rydberg atoms, polar molecules, or magnetic atoms.

17. The process of claim 13, wherein the long-range interaction comprises a dipole-dipole interaction among the particles in a three-dimensional arrangement.

18. The process of claim 13, wherein the particles are arranged in a periodic array or a disordered array.

19. The process of claim 13, wherein the particles are arranged in a one-dimensional array, a two-dimensional array, or a three-dimensional array.

* * * * *